United States Patent
McDaniel et al.

(10) Patent No.: US 12,135,266 B2
(45) Date of Patent: Nov. 5, 2024

(54) REAL TIME MONITORING OF NON-NEWTONIAN FLUIDS

(71) Applicants: The Florida International University Board of Trustees, Miami, FL (US); Savannah River Nuclear Solutions, LLC, Aiken, SC (US)

(72) Inventors: Dwayne E. McDaniel, Miami, FL (US); Ahmadreza Abbasi Baharanchi, Miami, FL (US); Michael Poirier, Aiken, SC (US); Shervin Tashakori, Miami, FL (US)

(73) Assignees: The Florida International University Board of Trustees, Miami, FL (US); Savannah River Nuclear Solutions, LLC, Aiken, SC (US)

( * ) Notice: Subject to any disclaimer, the term of this patent is extended or adjusted under 35 U.S.C. 154(b) by 284 days.

(21) Appl. No.: 17/654,006

(22) Filed: Mar. 8, 2022

(65) Prior Publication Data
US 2022/0291106 A1   Sep. 15, 2022

Related U.S. Application Data

(60) Provisional application No. 63/158,060, filed on Mar. 8, 2021.

(51) Int. Cl.
*G01N 11/08*   (2006.01)
*G01N 11/00*   (2006.01)

(52) U.S. Cl.
CPC ...... *G01N 11/08* (2013.01); *G01N 2011/0033* (2013.01)

(58) Field of Classification Search
None
See application file for complete search history.

(56) References Cited

U.S. PATENT DOCUMENTS

| | | | | |
|---|---|---|---|---|
| 3,468,158 A | * | 9/1969 | Chien | G01N 11/08 73/54.05 |
| 5,394,738 A | * | 3/1995 | Bass | G01N 11/14 73/54.06 |
| 2009/0090504 A1 | * | 4/2009 | Weightman | G01N 11/04 166/250.01 |
| 2015/0330213 A1 | * | 11/2015 | van Oort | E21B 47/06 73/152.31 |
| 2019/0178770 A1 | * | 6/2019 | Marum | E21B 47/06 |

OTHER PUBLICATIONS

Ahmadreza Abbasi Baharanchi et al., Development of Methods for In-line Monitoring of Yield Stress During the Transfer of Radioactive Waste-20435, Waste Management Symposia, Mar. 8-12, 2020, Phoenix, Arizona, USA, 10 pages.

* cited by examiner

*Primary Examiner* — Patrick Assouad
*Assistant Examiner* — Mark A Shabman
(74) *Attorney, Agent, or Firm* — SALIWANCHIK, LLOYD & EISENCHENK

(57) ABSTRACT

Systems and methods for determining the yield stress of a non-Newtonian fluid in real time are provided. A pressure loss and/or liquid rise technique, an ultrasonic technique, and/or a penetrometer technique can be used to determine the yield stress of a non-Newtonian fluid. The ultrasonic technique can include a longitudinal wave approach and/or a shear wave approach. The methods and systems are non-invasive and only require slight modifications to the piping containing the non-Newtonian fluid in order to measure the yield stress.

4 Claims, 24 Drawing Sheets

REAL TIME MONITORING OF NON-NEWTONIAN FLUIDS

CROSS-REFERENCE TO RELATED APPLICATION

This application claims the benefit of U.S. Provisional Application Ser. No. 63/158,060, filed Mar. 8, 2021, the disclosure of which is hereby incorporated by reference in its entirely, including all figures, tables, and drawings.

GOVERNMENT SUPPORT

This invention was made with government support under DEAC09-08SR224470 awarded by the U.S. Department of Energy (DOE). The government has certain rights in the invention.

BACKGROUND

The sampling of slurries for their material properties in various locations at the Hanford and Savannah River Site (SRS) is an essential process to ensure effective and safe operation of processes. Currently, characterization of yield stress at the Savannah River and Hanford sites is often from manual sample collection of the slurry, which involves interruption to the processes, and analysis using a rheometer. During the collection stage of this analysis, the process must be interrupted, resulting in delays, and it also is likely to risk personnel exposure to the toxic nature of the radioactive waste slurry.

BRIEF SUMMARY

Embodiments of the subject invention provide novel and advantageous systems and methods for determining the yield stress and/or pseudoplastic behavioral characteristics of a non-Newtonian fluid in real time. A pressure loss and/or liquid rise technique, and/or an ultrasonic technique can be used to determine the yield stress of a non-Newtonian fluid. The ultrasonic technique can include a longitudinal wave approach and/or a shear wave approach. The wave velocity in a non-Newtonian slurry can first be correlated with yield stress, and once the correlation is established, the wave velocity can be measured and the yield stress can be determined based on the correlation. The methods and systems of embodiments of the subject invention are non-invasive and only require slight modifications to the piping (containing the non-Newtonian fluid) to measure the yield stress.

In an embodiment, a system for determining yield stress of a non-Newtonian fluid can comprise: a pipe containing the non-Newtonian fluid; and a differential type pressure transmitter connected to a first point of the pipe and a second point of the pipe, the pipe comprising a fully-developed laminar flow of the non-Newtonian fluid between the first point and the second point (alternatively, a differential pressure transmitter can be used to measure the difference). The differential type pressure transmitter can be configured to measure a first pressure of the pipe at the first point and a second pressure of the pipe at the second point. The yield stress of the non-Newtonian fluid can be determined based on the difference between the first pressure and the second pressure. The determining of the yield stress can comprise utilizing Equations (1)-(3) presented herein. The system can further comprise a processor and a (non-transitory) machine-readable medium in operable communication with the processor and having instructions stored thereon that, when executed by the processor, solve Equations (1), (2), and (3) in order to determine the yield stress of the non-Newtonian fluid. The system can further comprise a flow meter connected to the pipe and configured to measure a velocity of the non-Newtonian fluid, and the flow meter can be further configured to adjust a flow of the non-Newtonian fluid in the pipe to ensure that it is fully-developed laminar flow between the first point and the second point. A method for determining yield stress of a non-Newtonian fluid can comprise: providing the system; measuring the difference between the first pressure and the second pressure using the differential type pressure transmitter; and determining the yield stress of the non-Newtonian fluid based on the difference between the first pressure and the second pressure. The yield stress can be determined in real time without any sample of the non-Newtonian fluid being removed from the pipe.

In another embodiment, a system for determining yield stress of a non-Newtonian fluid, the system can comprise: a pipe containing the non-Newtonian fluid; an extension extending vertically from the pipe and configured to have a height of the non-Newtonian fluid contained therein measured; and a pressure measurement device (e.g., a differential type pressure transmitter) configured to measure a first pressure at a first point where the non-Newtonian fluid is at its highest height within the extension and a second pressure at a second point where the extension meets the pipe. The yield stress of the non-Newtonian fluid can be determined based on the height of the non-Newtonian fluid in the extension and based on the difference between the first pressure and the second pressure. The determining of the yield stress can comprise utilizing Equation (7) presented herein. The system can further comprise a processor and a (non-transitory) machine-readable medium in operable communication with the processor and having instructions stored thereon that, when executed by the processor, solve Equation (7) in order to determine the yield stress of the non-Newtonian fluid. The system can further comprise a flow meter connected to the pipe and configured to adjust a flow of the non-Newtonian fluid in the pipe. A method for determining yield stress of a non-Newtonian fluid can comprise: providing the system; measuring the difference between the first pressure and the second pressure using the pressure measurement device; measuring the height of the non-Newtonian fluid in the extension; and determining yield stress of the non-Newtonian fluid based on the height of the non-Newtonian fluid in the extension and based on the difference between the first pressure and the second pressure. The yield stress can be determined in real time without any sample of the non-Newtonian fluid being removed from the pipe.

In another embodiment, a system for determining yield stress of a non-Newtonian fluid, the system can comprise: a pipe containing the non-Newtonian fluid; and an ultrasonic transducer (e.g., a longitudinal ultrasonic transducer) in operable communication with the pipe and configured to measure speed of sound within the pipe. The pipe can be configured to be tilted while speed of sound measurements are taken using the ultrasonic transducer, though this is not necessary. The yield stress of the non-Newtonian fluid can be determined based on the speed of sound within the pipe. The determining of the yield stress can comprise correlating the speed of sound within the pipe with known values of speed of sound and yield stress for the non-Newtonian fluid. The ultrasonic transducer can be, for example, an oscilloscope. A method for determining yield stress of a non-Newtonian fluid can comprise: providing the system; measuring the speed of sound within the pipe (e.g., while the pipe is being tilted, though this is not necessary); and determining the yield stress of the non-Newtonian fluid based on the speed of sound within the pipe. The method can further comprise, before measuring the speed of sound within the pipe having the non-Newtonian fluid, measuring the speed of sound within the pipe for a plurality of non-Newtonian fluids each with a respective different known yield stress to create a correlation of speed of sound within the pipe and yield stress. The yield stress can be determined in real time without any sample of the non-Newtonian fluid being removed from the pipe.

DETAILED DESCRIPTION

Figure 1:
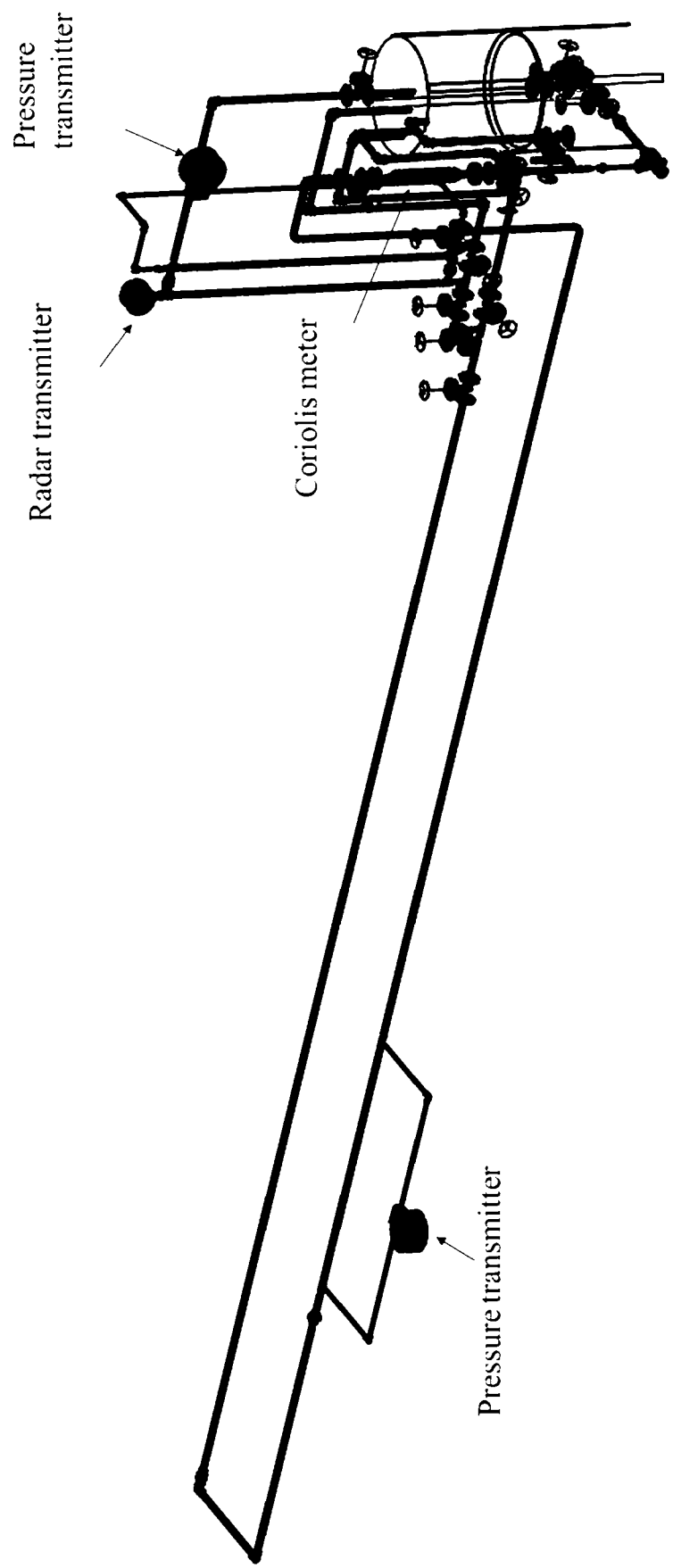
FIG. 1 shows an image of a (20-foot, one-inch) stainless steel loop with applied technologies for pressure loss and liquid rise testing.

Embodiments of the subject invention provide novel and advantageous systems and methods for determining the yield stress of a non-Newtonian fluid in real time. A pressure loss and/or liquid rise technique, and/or an ultrasonic technique can be used to determine the yield stress of a non-Newtonian fluid. The ultrasonic technique can include a longitudinal wave approach and/or a shear wave approach. The wave velocity in a non-Newtonian slurry can first be correlated with yield stress, and once the correlation is established, the wave velocity can be measured and the yield stress can be determined based on the correlation. The methods and systems of embodiments of the subject invention are non-invasive and only require slight modifications to the piping (containing the non-Newtonian fluid) to measure the yield stress.

Determining the yield stress of a non-Newtonian fluid (e.g., slurries at the Hanford and SRS) in real-time and in-line, meaning without delay to the operations at the site and without altering the current design by implementing the technology directly at an existing section of the system, can provide significant improvement towards time savings, safety, and efficiency. This can also reduce secondary waste generated from material characterization, and eliminate errors from the rheological properties of the slurry changing over time. Other benefits include a reduction of risk to process upsets and an increase in the maximum solids concentrations of waste that can be processed at the sites. In addition, there could be a significant cost savings associated with real-time in-line monitoring (RTIM) technology. A specific need for the development and deployment of RTIM technology at a site (e.g., Hanford and SRS) involves obtaining yield stress of the slurry in the Direct-Feed Low Activity Waste System feeding the Melter Feed Preparation Vessel. Benefits of such monitoring can include precise control of water addition, a more efficient utilization of the Melter Feed Preparation Vessel and minimized condensate processing in the submerged bed scrubber unit.

Several methods for yield stress measurements were identified and investigated, including liquid rise, pressure loss in laminar flow, longitudinal ultrasonic techniques, and shear-wave ultrasonic techniques. For the liquid rise method, yield stress is derived due to an equilibrium of forces acting in a column of liquid in both static and dynamic conditions. Force created by pressure differential $\Delta P$, yield stress, and gravity, keeps a yield stress slurry (e.g., a kaolin-water slurry) at a level inside the vertical branch. The pressure loss method analyzes pressure difference between two points in a fully developed laminar flow of simulants. Pressure difference is related to yield stress and consistency of material through the friction coefficient. For both of these methods, it was determined that it was possible to predict yield stress values independent of flow velocity and pressure drop in a wide range of flow rates, resulting in precise values at a wide range of operating conditions. For the ultrasonic investigations, the objective was to determine the relationship between yield stress and speed of sound in longitudinal and shear wave modes, and the longitudinal wave analysis demonstrated that there was a change in sound propagation due to a change of yield stress in this wave mode. Investigations on pressure loss and liquid rise methods were continued by independently implementing them into an intermediate scale loop with integration of the ultrasonic sensors for determining the time of flight (ToF) in static or dynamic flow conditions within a pipe.

Related art systems and methods for obtaining rheological information for non-Newtonian fluids obtain a sample of the fluid and have it analyzed in laboratory equipment. This takes a significant amount of time and during that time, the properties could change. In addition, the fluid mechanics and fluid stresses are often different between the pipeline and the rheology measurement device. Embodiments of the subject invention do not require sampling or laboratory analysis and can provide a measurement of yield stress at any point in time.

Some fluids exhibit characteristics that are non-Newtonian and understanding and characterizing these fluids real time, would be of great significance to a number of industries (e.g., oil and gas, mining, food, and personal care products). Embodiments of the subject invention can utilize ultrasonic methods to obtain the yield-stress of non-Newtonian fluids in real time. These methods are non-invasive and only require slight modifications to the piping to measure the yield stress. In order to obtain this information in typical related art systems and methods, grab samples are collected from the process and sent to laboratories for analysis. The process of the collecting the sample, as well as the time between sample collection and laboratory measurement, can change the rheology of the fluid. Embodiments of the subject invention include two approaches: 1) longitudinal wave; and 2) shear wave. The wave velocity in a non-Newtonian slurry can first be correlated with yield stress. Once the correlation is established, the wave velocity can be measured and the yield stress can be determined. In other embodiments, pressure loss and liquid rise systems and methods can be used to obtain the yield-stress of non-Newtonian fluids real time. These methods are also non-invasive and only require slight modifications to the piping to measure the yield stress.

Sampling or monitoring of properties in various locations within Hanford and Savannah River sites is essential for effective and safe operation of processes. However, RTIM of properties such as slurry yield stress is gaining attention for its various benefits such as significant time savings and increased safety/efficiency of processes while reducing secondary waste due to sampling, potentially indicate undetected process upsets, and assist in running closer to the maximum solids concentration of waste being processed in the site. A specific need for the development and deployment of a RTIM technology at Hanford involves obtaining yield stress of the slurry in the Direct-Feed Low Activity Waste System feeding the Melter Feed Preparation Vessel and EMF evaporator. Yield stress as a limiting property (to meet processability) is crucial to determine water addition to the Melter Feed Preparation Vessel.

Yield stress can be measured via several direct and indirect methods. Complexity with the measurement of this quantity is that a number of systems work in operating conditions far away from the yield point and many are not designed for high flow speeds or low viscosity and yield stress ranges. Examples of these technologies include vibrational (sweep and squeeze) and rotational rheometers where measurements take place away from zero shear rate region.

In ultrasonic methods of embodiments of the subject invention, a relationship between yield stress and speed of sound in longitudinal and shear wave modes can be utilized. The direct relationship between yield stress and shear modulus is the basis of the methods. In longitudinal mode, variation of sound velocity can be monitored before and after yielding of the slurry. In shear mode, existence of a shear wave velocity, which is directly related to shear modulus, is the basis. Direct measurements of time of flight on oscilloscopes along with measurements of shear modules and yield stress on a rheometer can be utilized to create a map between theses variables.

In the pressure loss systems and methods of embodiments of the subject invention, pressure loss between two points in a fully developed flow of yield stress fluids can be measured using a differential type pressure transmitter. In the case of Bingham plastic fluids, pressure drop is related to yield stress and consistency of the material through the friction coefficient derived from the Swamee-Aggarwal correlation as shown in Equations (1) and (2).

$$\frac{\Delta P}{L} = \frac{f \rho V^2}{2D} \quad (1)$$

$$f_L = 64/Re + (64/Re)^*(He/6.2218Re)^{0.958} \quad (2)$$

Figure 15:
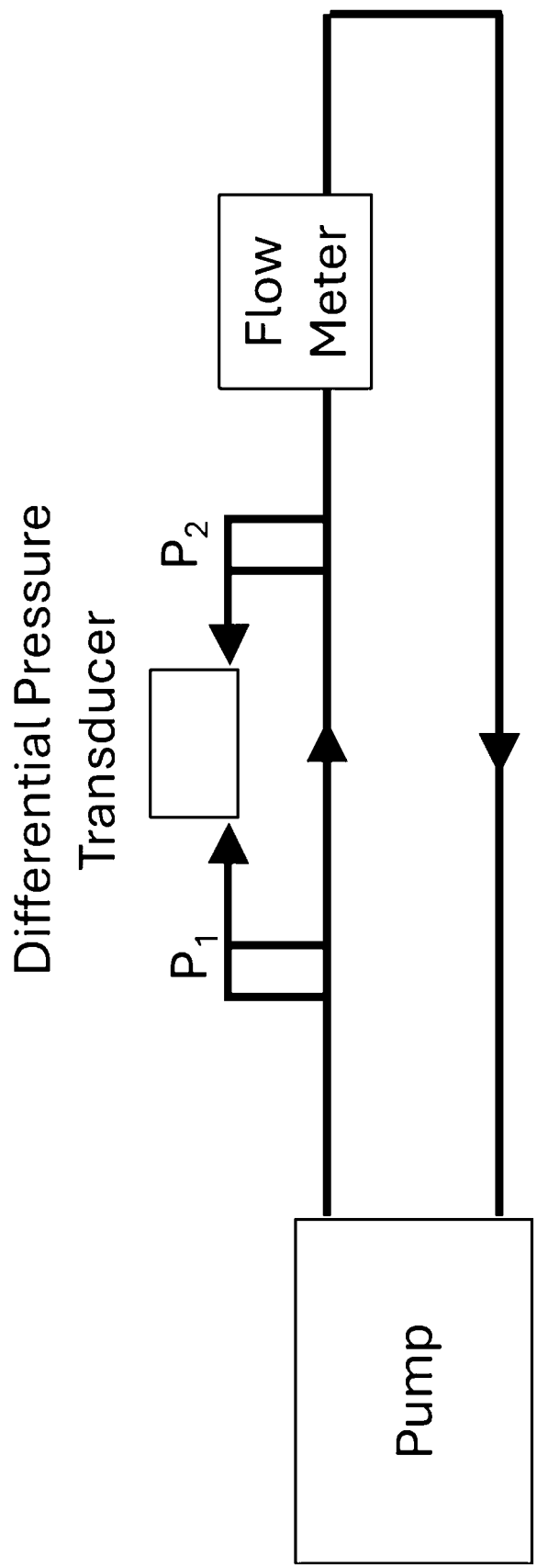
FIG. 15 shows a schematic view of a pipeline for testing the pressure differential method.

Presence of yield stress ($\tau_y$) and viscosity ($\mu$) in the friction factor required a system of equations generated at two flow velocities, $V_1$ and $V_2$. A simple test setup, as shown in FIG. 15, can provide pressure drop and velocity data required to calculate for $\tau_y$ and $\mu$.

Here, He and Re values are Hedstrom and Reynolds numbers, respectively, calculated from Equations (3) and (4), respectively.

$$He_{BP} = \frac{D^2 \rho \tau_y}{\mu^2} \quad (3)$$

$$Re_{BP} = \frac{\rho V D}{\mu} \quad (4)$$

In Equations (1)-(4), $\Delta P$ is the pressure differential (difference), L is a length of the pipe between the points where the pressure difference is measured, D is a diameter of the pipe between the points where the pressure difference is measured, $\rho$ is a density of the non-Newtonian fluid, f (or $f_L$) is a frictional coefficient of the non-Newtonian fluid, V is a velocity of the non-Newtonian fluid in the pipe between the points where the pressure differential is measured, $\mu$ is a viscosity of the non-Newtonian fluid, $Re_{BP}$ is a Reynolds number of the non-Newtonian fluid in the pipe between the first point and the second point, He is a Hedstrom number of the non-Newtonian fluid in the pipe between the first point and the second point, and $\tau_y$ is the yield stress of the non-Newtonian fluid.

In order to achieve laminar flows, the critical Reynolds number was calculated from a correlation, as shown in Equation (5) (see also Hallbom, Pipe Flow of Homogeneous Slurry, University of British Columbia (Vancouver), 2008; which is hereby incorporated herein by reference in its entirety). Flow velocity was adjusted through control valves so that values found from Equation (4) were less than critical Reynolds number.

$$Re_{BP,C} = 2100 + \left(1 + \frac{He_{BP}}{6Re_{BP,C}}\right) \quad (5)$$

In order to ensure fully developed conditions, the correlation for hydrodynamic entrance length in laminar flow was used (Equation (6)).

$$L_{FD,lam} \approx 0.05 \, Re_{BP} D \quad (6)$$

An entrance length of 76 cm (30 inch) was calculated for flow of kaolin-water mixtures with solid concentrations in the range of yield stress in the range of 8 to 20 vol % (corresponding yield stress range of 1 to 74 Pa). The maximum allowable flow rate with this entrance length was 1 gpm (maximum velocity of 0.35 m/s) for 8 vol % concentration and 5.3 gpm (maximum velocity of 1.7 m/s) for 20 vol % kaolin-water mixtures.

A setup was constructed for evaluation of the pressure loss methods inside a ½ NPT Standard-Wall pipe with 1.58 cm (0.622 inch) inside diameter. Pressure loss was obtained with less than 0.072% uncertainty using a PX-3005 pressure transmitter between two ports separated by 45 cm (~1.5 ft). A turbine type flow meter (Lake Monitors FlowStat Sensors) with a maximum 2% uncertainty was used for testing. In order to analyze the accuracy of this method, error levels induced by pressure transmitter and flow meter were considered and a maximum of 10 percent theoretical error was calculated.

In order to enable real-time monitoring during experiments, an equation solver program in MATLAB was coupled with a VI program in LabVIEW. Testing was performed using a 11 vol % kaolin-water mixture over a wide range of flow rate values (0.5 to 1.7 gpm). Consistent values for yield stress were obtained around an average 3.1 Pa value and were close to 2.7 Pa obtained from the rheometer.

Figure 2:
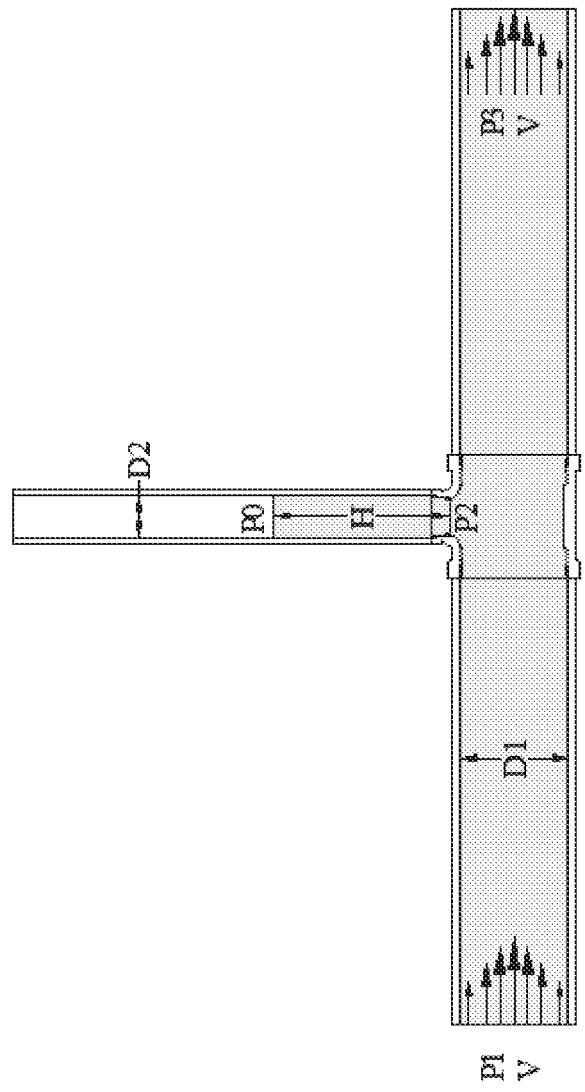
FIG. 2 shows a schematic view of the liquid rise method in the dynamic condition, according to an embodiment of the subject invention.
Figure 3A:
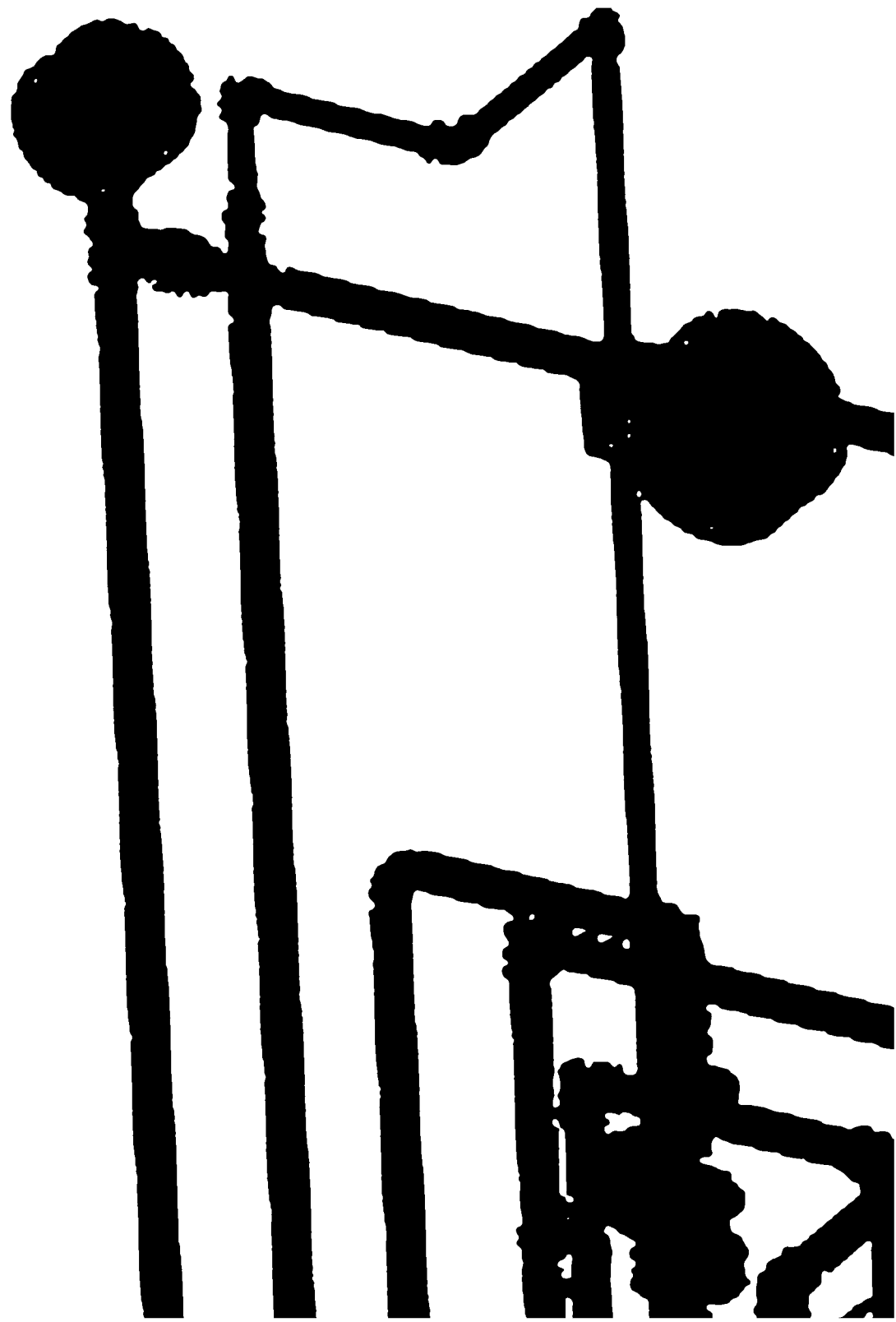
FIG. 3A shows an image of a Vertical Riser with Echo-wave LG11 radar probe and clear PVC pipe for visualization.
Figure 3B:
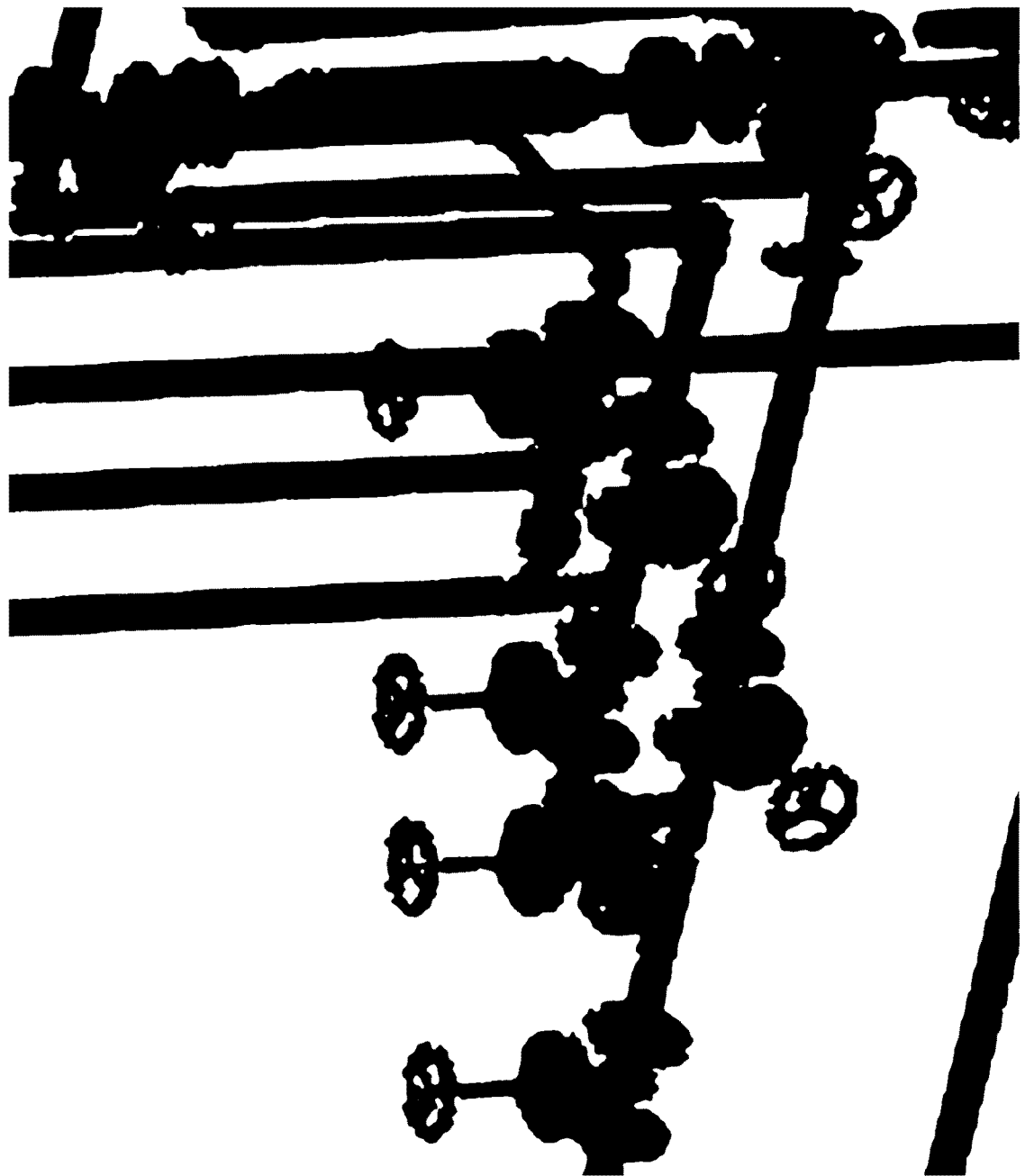
FIG. 3B shows an image of an Omega PX-3005.

The liquid rise systems and methods of embodiments of the subject invention are based on balance of forces that act across a column of liquid in both static (no-flow) and dynamic (flowing) conditions. By considering a dynamic condition, as shown in FIG. 2, a balance between forces created by the pressure differential, $\Delta P$ ($P_2 - P_0$), yield stress, and gravity keeps the slurry at height H inside the vertical branch. This is shown in Equation (7).

$$\Delta P \left(\frac{\pi (D_2)^2}{4}\right) = \tau_y (\pi D_2 H) + \rho g H \left(\frac{\pi (D_2)^2}{4}\right) \quad (7)$$

In Equation (7), $\Delta P$ is the pressure differential (see FIG. 2), $D_2$ is a diameter of the extension where the liquid rise is measured, p is a density of the non-Newtonian fluid, H is the height of the non-Newtonian fluid in the extension, g is gravity (9.8 meters/second²), $\pi$ is standard (the ratio between the circumference of a circle and its diameter), and $\tau_y$ is the yield stress of the non-Newtonian fluid.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

EXAMPLE 1

In order to achieve the objectives of determining the yield stress of a kaolin-water slurry simulant using the pressure loss, liquid rise, and ultrasonic methods, a one-inch diameter standard steel pipe loop was constructed. This loop, shown in FIG. 1, contains a pressure drop measurement section of ½ Nominal Schedule-40 pipe for the pressure loss method and two 1-inch Nominal Schedule-40 vertical pipe sections (one steel and one clear PVC) for the liquid rise method. A Dayton 0.5 HP mixer with an upgraded 6-inch propeller allows for efficient mixture of the slurry, which is transported through the loop via a 36 gallons per minute (gpm) centrifugal pump. A 1-inch Khrone Optimass 1000 Coriolis meter was installed at the entrance of the loop to measure the flow rate and density of the material flowing through the loop in real time. These additions, along with coupling of LabVIEW and MATLAB code, enabled real-time monitoring of yield stress during experiments.

The liquid rise method utilizes an equilibrium of forces that act across a column of liquid in both static and dynamic conditions.

$$\Delta P \left( \frac{\pi (D_2)^2}{4} \right) = \tau_y (\pi D_2 H) + \rho g H \left( \frac{\pi (D_2)^2}{4} \right) \quad (8)$$

Here, $\Delta P$ refers to the pressure difference between the pressures at the base of the vertical section P2 and the pressure found at the top of the fluid column P0 in Pascals (Pa), D2 is the pipe diameter of the vertical riser in inches, $\rho$ is the fluid density in kilograms per cubic meter (kg/m³), H is the height of the fluid column in inches (in), and $\tau_y$ is the yield stress in Pa.

The engineering-scale setup shown in FIG. 1 was used to measure the yield stress based on Equation (8) using an Echowave LG10 radar probe to measure the fluid level in the steel vertical pipe. This radar probe shows the height value of the fluid in the vertical column, while a clear PVC section allows the user to visualize the height of the fluid. An Omega PX-3005 compact range pressure transmitter senses the difference in pressure of the base of the clear PVC vertical pipe and the top of the clear PVC vertical pipe, which is open to atmospheric pressure.

Figure 4:
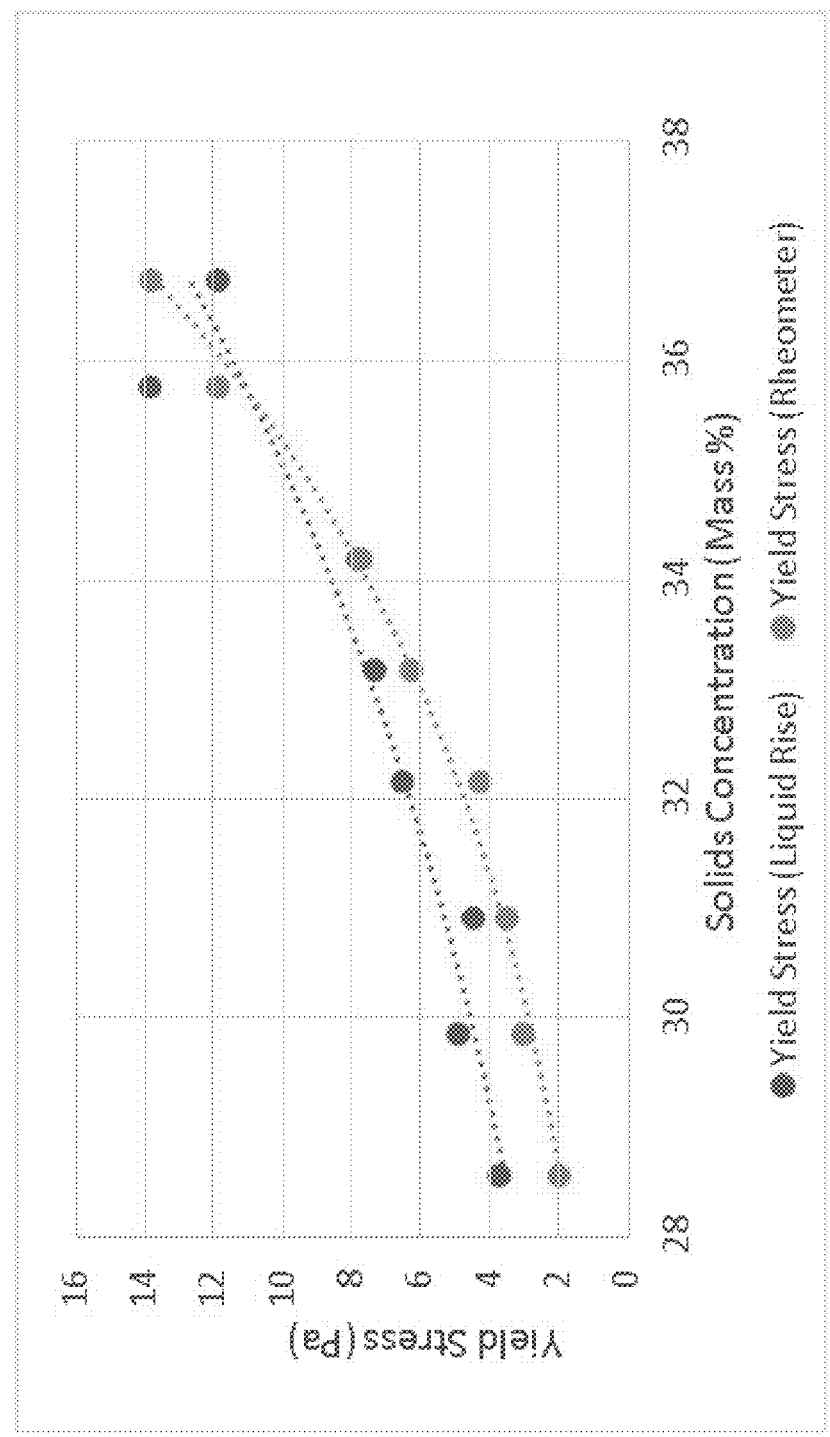
FIG. 4 shows a plot of yield stress (in Pascals (Pa)) versus solids concentration (in mass %), illustrating a comparison of yield stress measurements by the liquid rise method with yield stress measurements by a rheometer.
Figure 5:
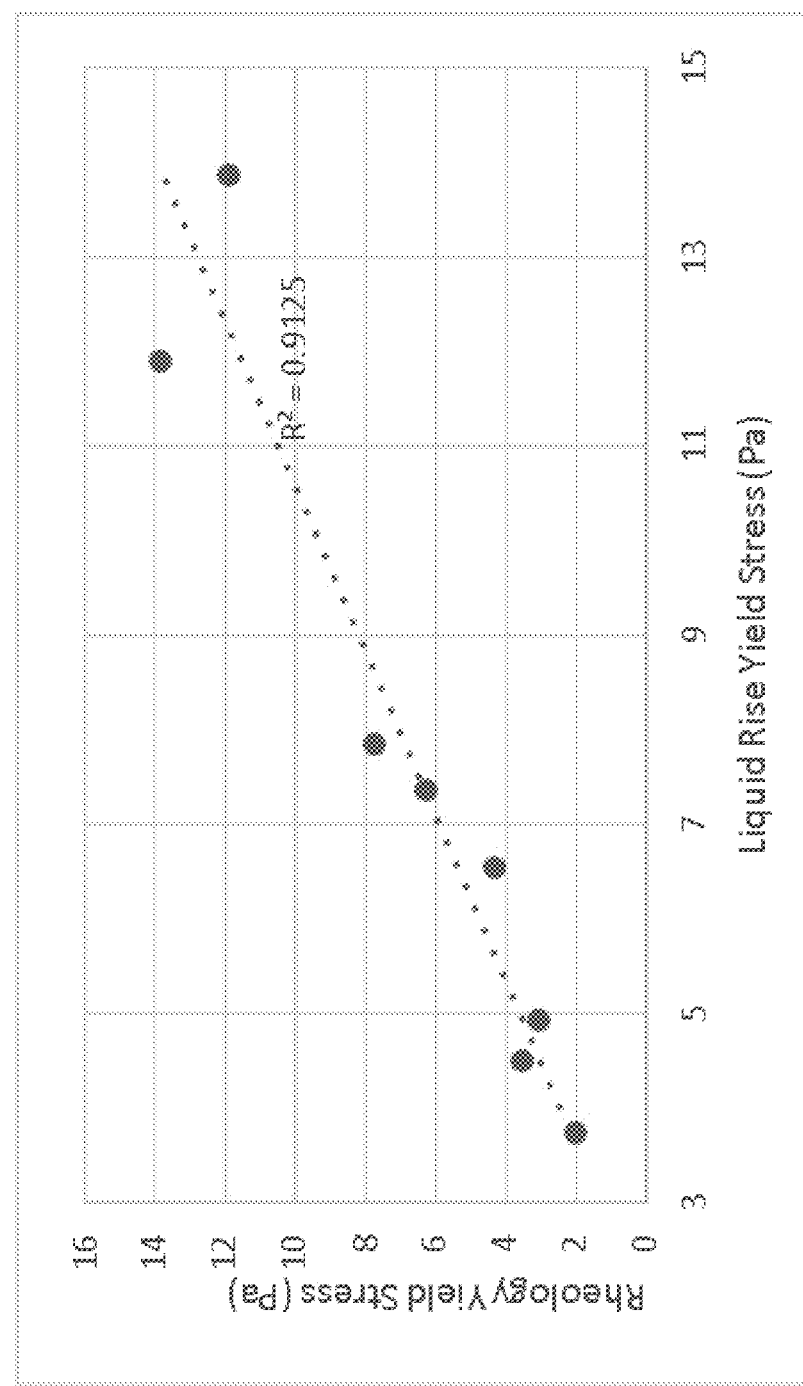
FIG. 5 shows a plot of rheology yield stress (in Pa) versus liquid rise yield stress (in Pa), illustrating agreement between yield stress monitored on a rheometer versus yield stress measured from the liquid rise method.
Figure 6A:
FIG. 6A shows an image of a Khrone Optimass 1000 Coriolis Meter for flow rate and density readings.
Figure 6B:
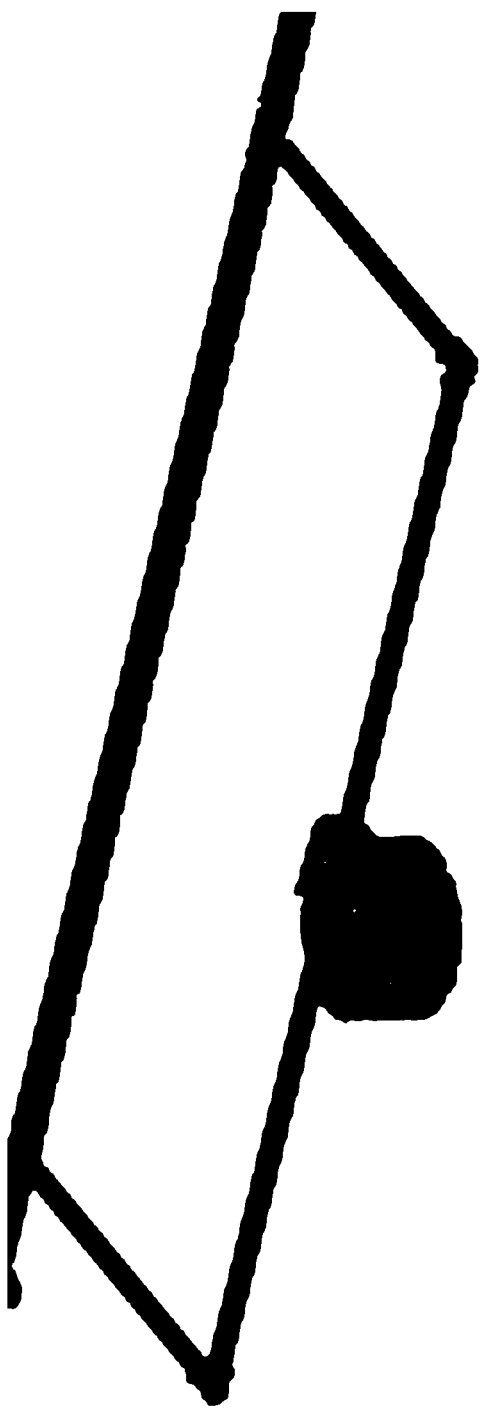
FIG. 6B shows an image of a PX-3005 Pressure Transmitter for pressure difference.

Experiments were initiated with a low specific gravity (SG) at 1.02 SG (3.45 wt %). Kaolin was introduced in the mixing tank to increase the concentration of the sample incrementally. For each step, with a fixed specific gravity of kaolin-water mixture, the yield stress of the fluid was documented using the liquid rise method. Each sample was collected from the discharge pipe of the loop and transported to a laboratory to be measured by a HAAKE ViscoTester iQ Air Rheometer with an FL40 4B/SS vane rotor from Thermofisher Scientific. The results collected in the liquid rise demonstrate an agreement with the rheology data from 2 Pa of yield stress at 1.22 SG (28.5 wt %) to 21.7 Pa of yield stress at 1.30 SG (37.0 wt %), shown in FIG. 4. A linear analysis comparing the rheometer yield stress to the liquid rise yield stress is shown in FIG. 5; with a linear fit coefficient $R^2=0.9125$ it can be demonstrated that there is a strong agreement between the two data sets.

EXAMPLE 2

In the pressure loss method, pressure difference between two points in a fully developed laminar flow of yield stress fluid was measured using a differential type pressure transmitter. Three different approaches (equations) were used to analyze the pressure drop: The Friction Factor equation (derived from the Buckingham-Reiner equation), the Polynomial equation, and the Swamee-Aggarwal equation. In the case of a Bingham plastic fluids, pressure drop is related to yield stress and consistency of the material through the friction coefficient in the Buckingham-Reiner equation. The Swamee-Aggarwal equation is a direct solution for the Darcy-Weisbach friction factor in laminar flow.

In the equations in Table 1, f is the friction factor, $Re_{BP}$ is the Reynolds number, and He is the Hedstrom number, where the yield stress can be derived, $\Delta P$ is the pressure difference of the pipe section, $\rho$ is the density of the fluid, D is the pipe diameter, and v is the fluid velocity. Also, $$Re_{BP} = \frac{\rho VD}{\mu}, He = \frac{D^2 \rho \tau_y}{\mu^2}, \text{ and } X = \frac{4L\tau_y}{D\Delta P}.$$

In the pressure loss section of the loop, for the flow to be laminar and fully developed, an entrance length of 2.5 feet was calculated, and was operated within the range of 1.25 SG (32.3 wt %) to 1.32 SG (39.13 wt %). The section of the loop was constructed with 2.5 feet of ½ Nominal, Schedule-40 steel pipe. Omega PX-3005 compact range pressure transmitter measured the difference in pressure at two points of the pipe placed 1.5 feet from each other. The Khrone Optimass 1000 Coriolis meter measured the density of the fluid and the mass flow rate of the fluid.

TABLE I

Equations and Correlations used in Pressure Loss Investigations

| Correlation | Description |
|---|---|
| $\dfrac{\Delta P}{L} = \dfrac{f \rho v^2}{2D}$ | Pressure Loss in Laminar Flow (Darcy-Weisbach Equation) |
| $f = \dfrac{16}{Re_{BP}}\left[1 + \dfrac{He}{6Re_{BP}} - \dfrac{He}{3f^3(Re_{BP})^7}\right]$ | Friction Factor Equation Derived from the Buckingham-Reiner Equation [4] |
| $\dfrac{\Delta P}{L} = \dfrac{4\eta}{D}\left(\dfrac{8V}{D}\right)\left(\dfrac{1}{1 - \dfrac{4X}{3} + \dfrac{X^3}{3}}\right)$ | Polynomial Equation [4] |
| $f_L = \dfrac{64}{Re} + \dfrac{64}{Re}\left(\dfrac{He}{6.2218Re}\right)^{0.958}$ | Swamee-Aggarwal Equation [5] |

Experiments were initiated with a high specific gravity fluid, and water was introduced in the mixing tank to decrease the concentration of the sample step by step. For each step, with a fixed specific gravity of kaolin-water mixture, initial and final sets of pressure difference and flow rate was obtained from the experimental setup and LabView combined with MATLAB were used to calculate the yield stress in real time.

Figure 7:
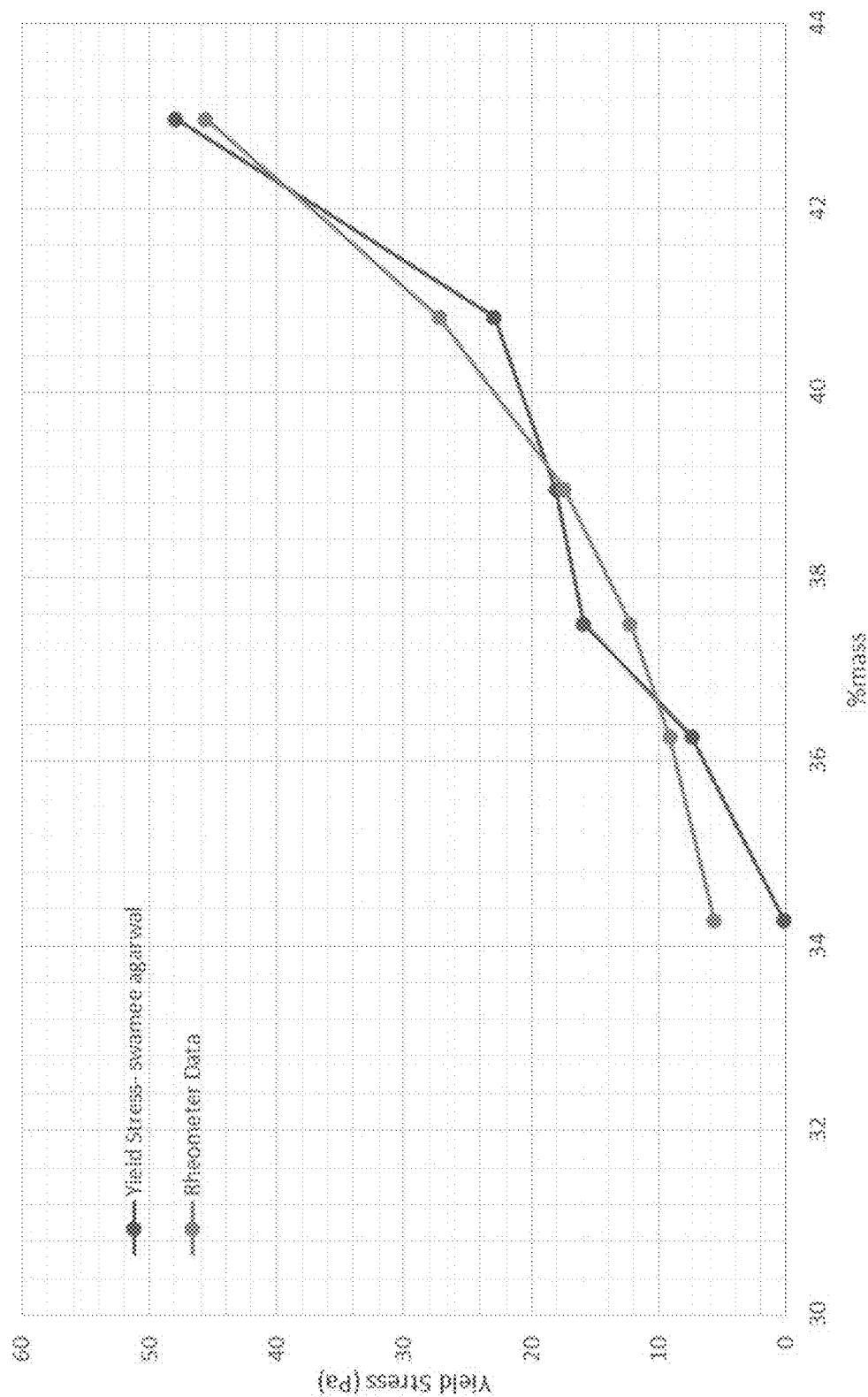
FIG. 7 shows a plot of yield stress (in Pa) versus solids concentration (in mass %), illustrating a comparison of yield stress versus solids concentration for candidate correlations compared with rheometer data.
Figure 8:
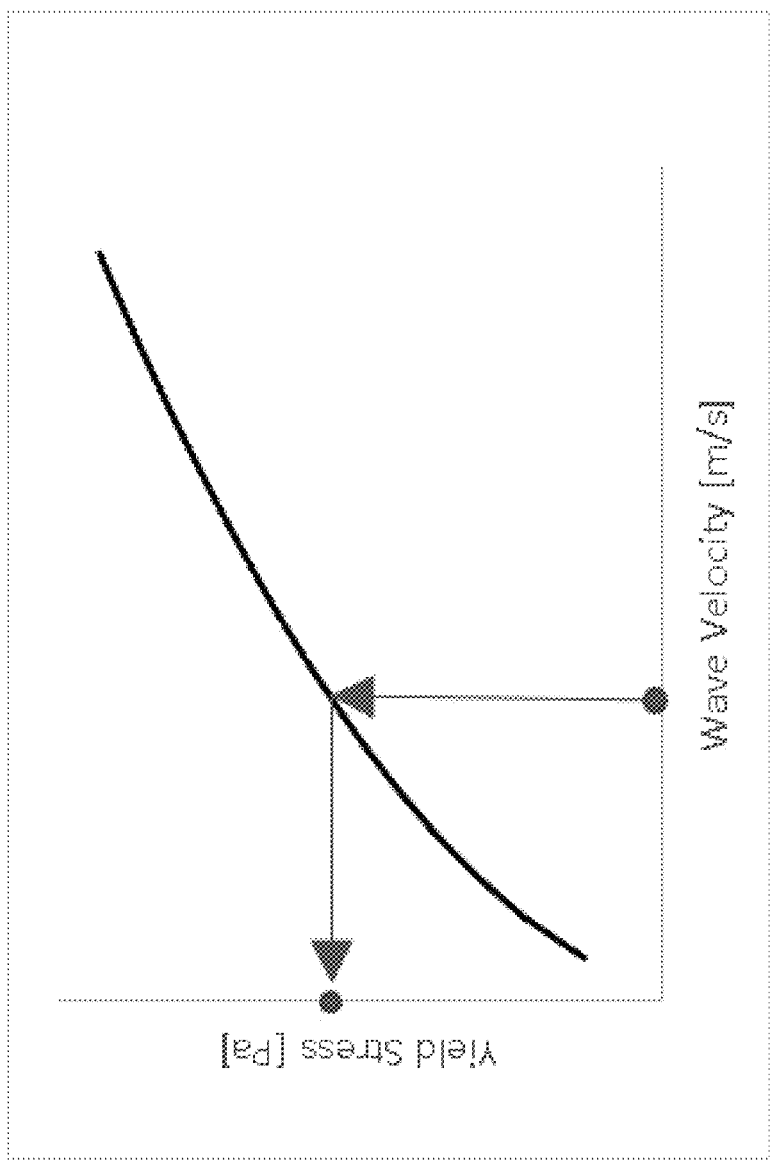
FIG. 8 shows a plot of yield stress (in Pa) versus wave velocity (in meters per second (m/s)) illustrating a model depicting wave velocity versus yield stress used to interpolate yield stress from wave velocity.
Figure 9B:
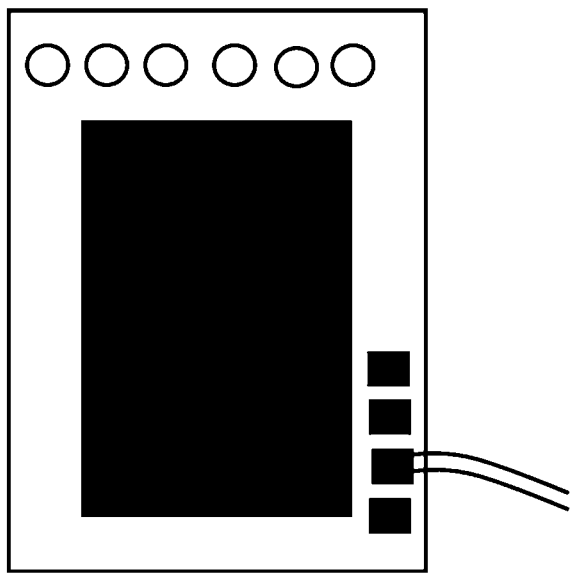
FIG. 9B (bottom left) shows an image of a MS044 mixed signal oscilloscope from Tektronix.
Figure 9C:
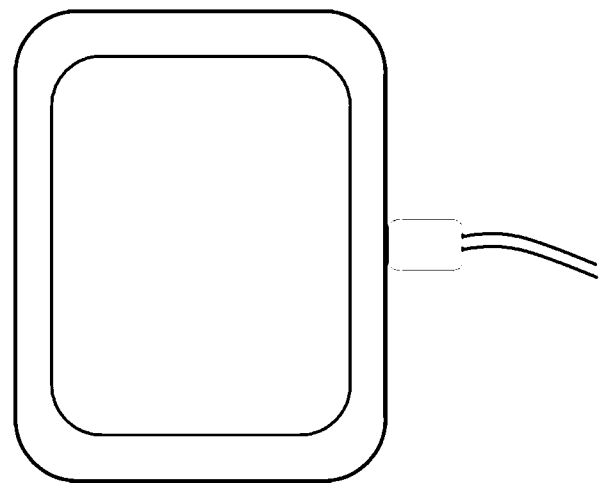
FIG. 9C (right) shows an image of a 1.6-inch plastic container with simulant.
Figure 9A:
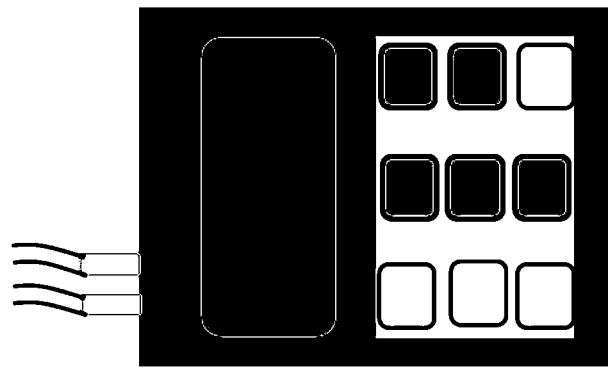
FIG. 9A (top left) shows an image of a Dakota Ultrasonics MX-5 thickness gauge with attached 5 megahertz (MHz) longitudinal transducer.
Figure 10B:
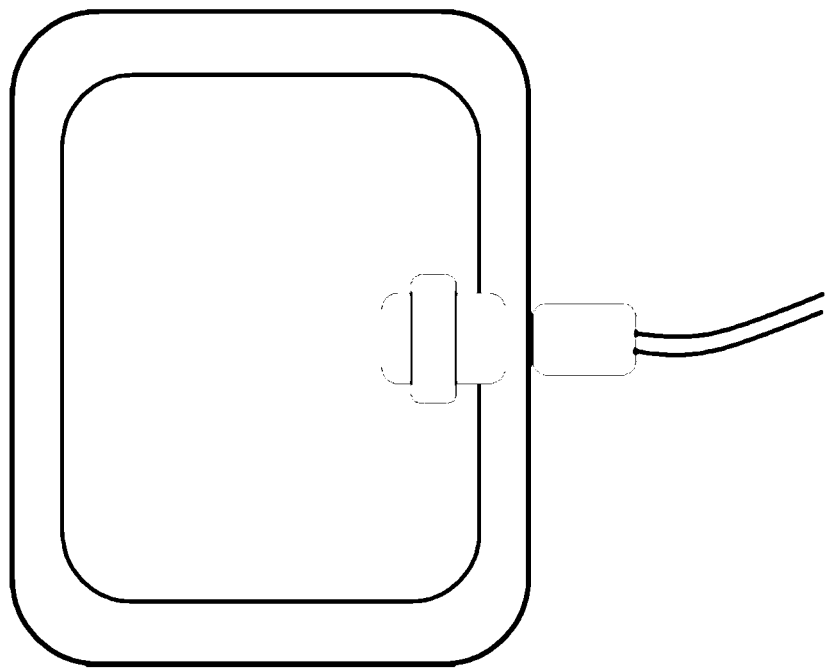
FIG. 10B shows an image of an immersion longitudinal wave transducer.
Figure 10A:
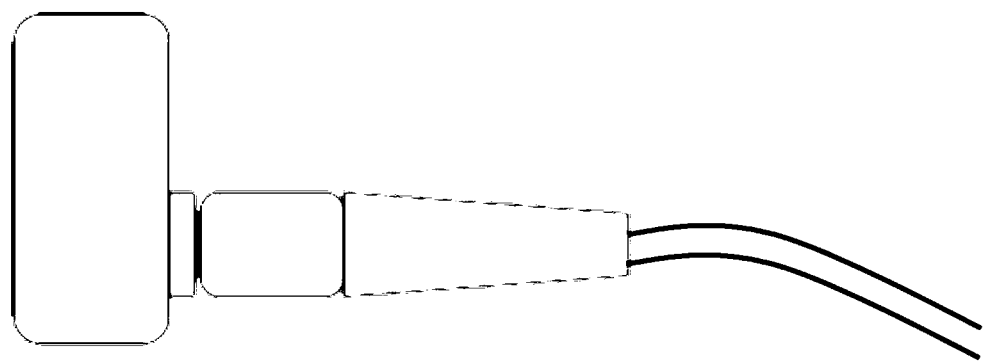
FIG. 10A shows an image of a 2.25 MHz longitudinal wave transducer.
Figure 11A:
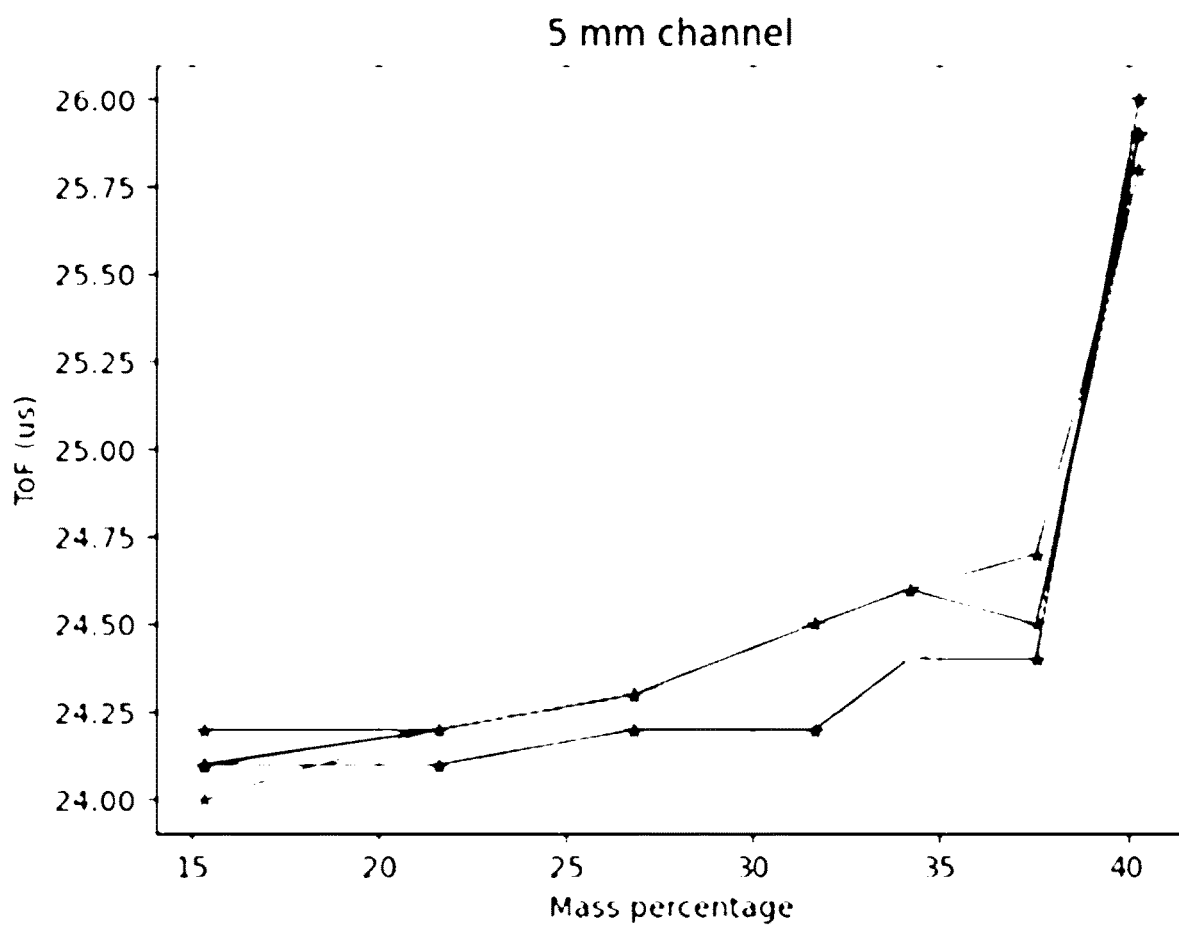
FIG. 11A (top left) shows a plot of time of flight (in microseconds (μs)) versus mass percentage illustrating time of flight versus solids concentrations of kaolin-water simulations for the 2.25 MHz low-frequency transducer on a 5 millimeter (mm) channel.
Figure 11B:
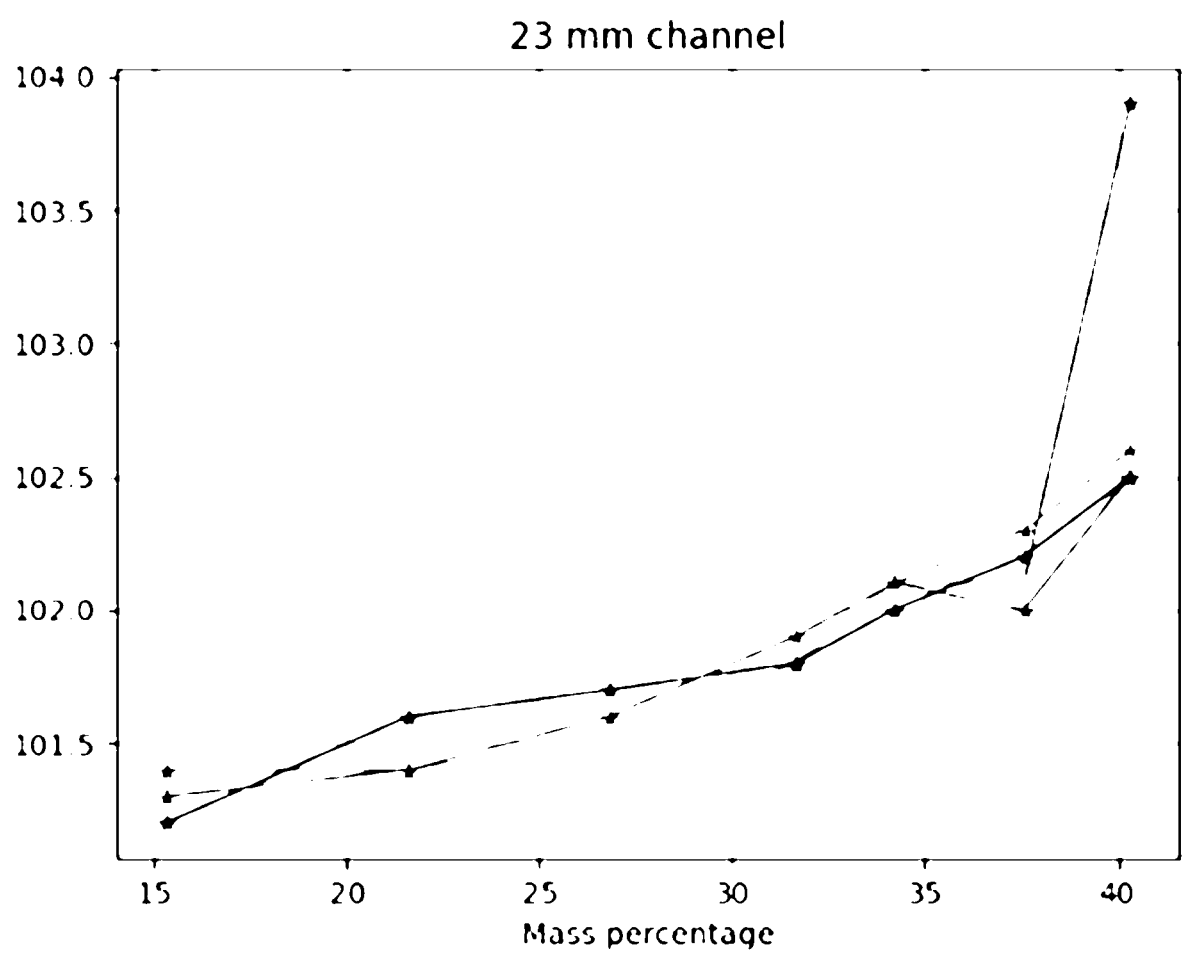
FIG. 11B (top right) shows a plot of time of flight (in μs) versus mass percentage illustrating time of flight versus solids concentrations of kaolin-water simulations for the 2.25 MHz low-frequency transducer on a 23 mm channel.
Figure 11C:
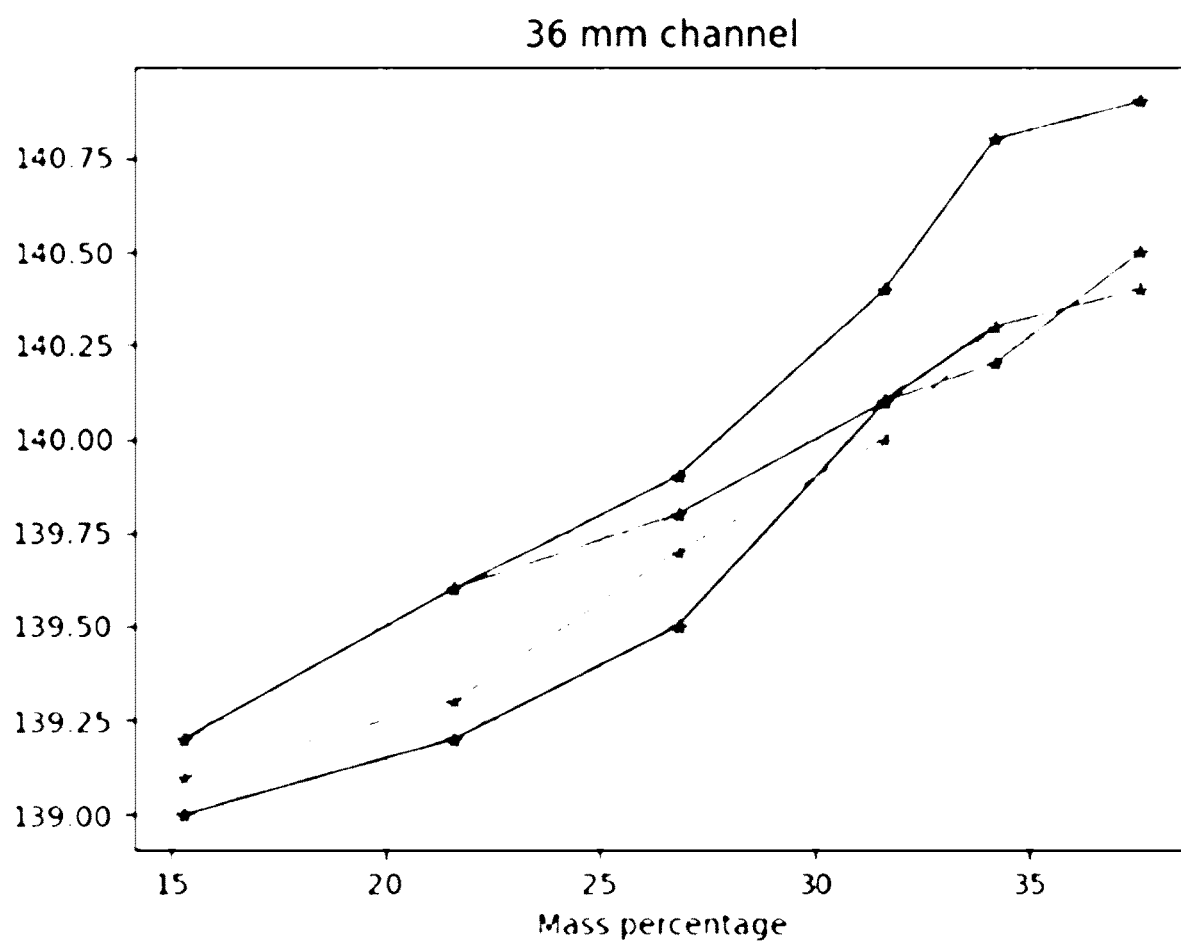
FIG. 11C (bottom left) shows a plot of time of flight (in μs) versus mass percentage illustrating time of flight versus solids concentrations of kaolin-water simulations for the 2.25 MHz low-frequency transducer on a 36 mm channel.
Figures 12A, 12B, 12C, 12D:
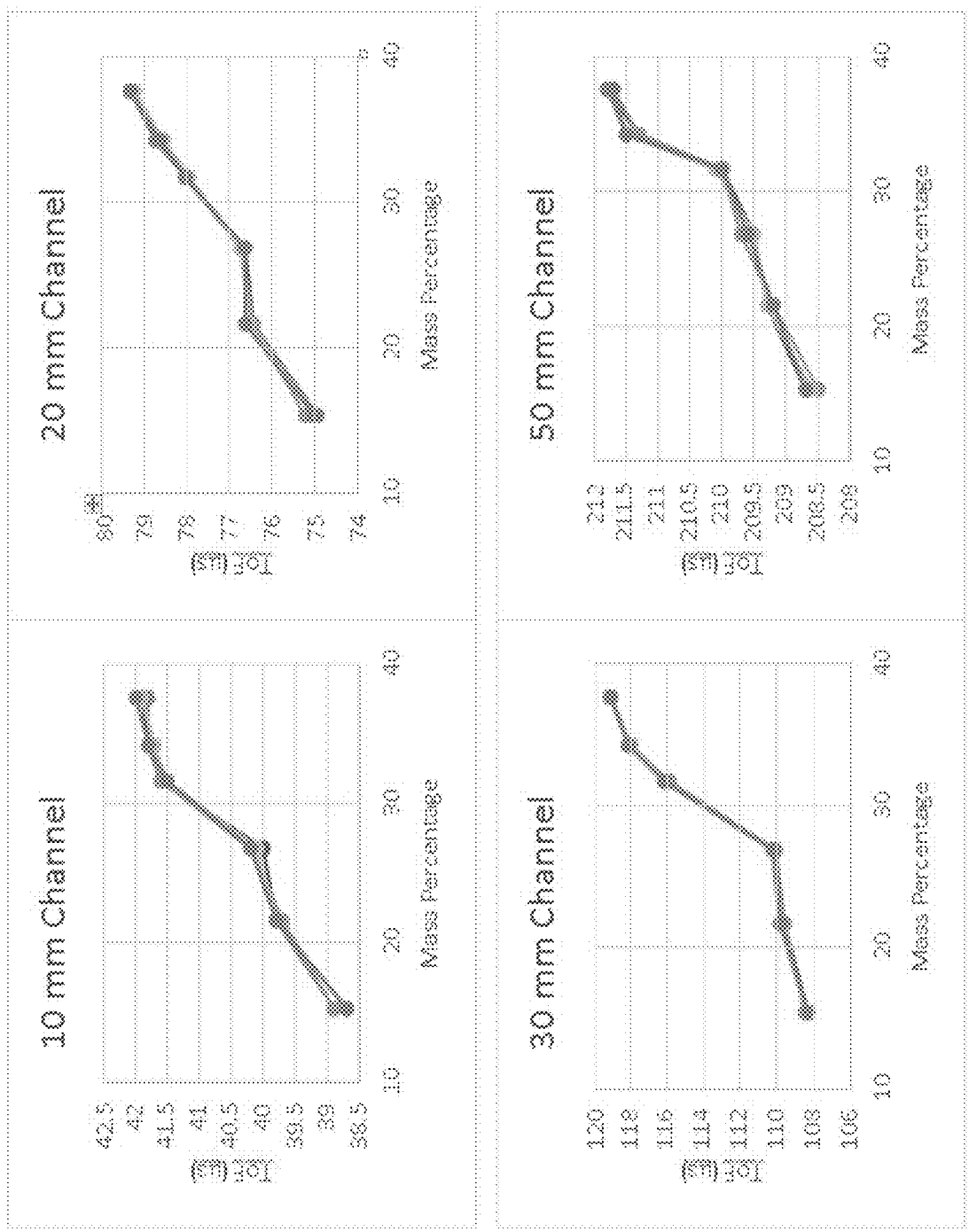
FIG. 12A (top left) shows a plot of time of flight (in μs) versus mass percentage illustrating time of flight versus solids concentrations of kaolin-water simulations for the 2.25 MHz low-frequency transducer on a 10 mm channel.
FIG. 12B (top right) shows a plot of time of flight (in μs) versus mass percentage illustrating time of flight versus solids concentrations of kaolin-water simulations for the 2.25 MHz low-frequency transducer on a 20 mm channel.
FIG. 12C (bottom left) shows a plot of time of flight (in μs) versus mass percentage illustrating time of flight versus solids concentrations of kaolin-water simulations for the 2.25 MHz low-frequency transducer on a 30 mm channel.
FIG. 12D (bottom right) shows a plot of time of flight (in μs) versus mass percentage illustrating time of flight versus solids concentrations of kaolin-water simulations for the 2.25 MHz low-frequency transducer on a 50 mm channel.
Figures 13A, 13B, 13C:
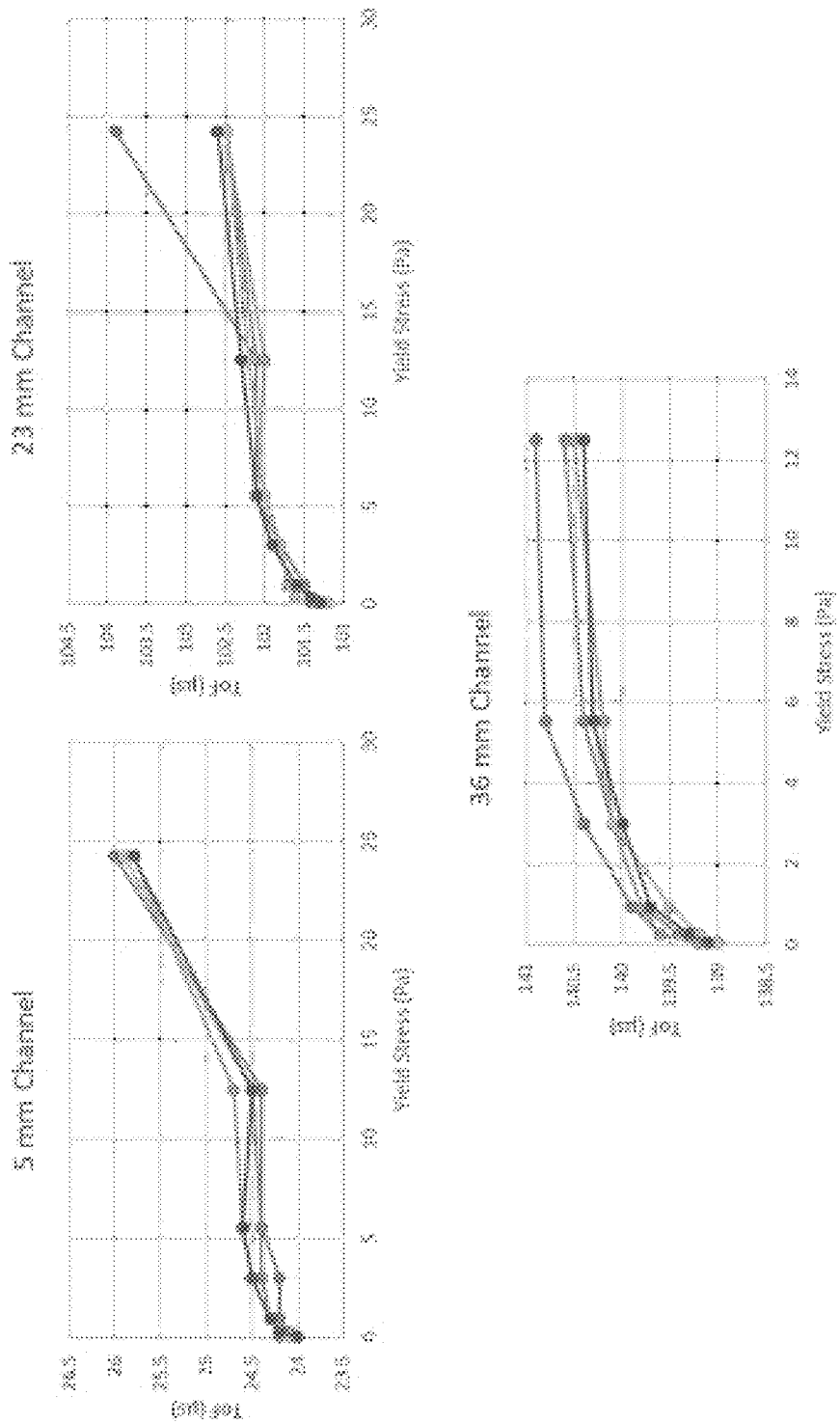
FIG. 13A (top left) shows a plot of time of flight (in μs) versus yield stress (in Pa) illustrating time of flight versus yield stress of kaolin-water simulations for the 2.25 MHz low-frequency transducer on a 5 mm channel.
FIG. 13B (top right) shows a plot of time of flight (in μs) versus yield stress (in Pa) illustrating time of flight versus yield stress of kaolin-water simulations for the 2.25 MHz low-frequency transducer on a 23 mm channel.
FIG. 13C (bottom) shows a plot of time of flight (in μs) versus yield stress (in Pa) illustrating time of flight versus yield stress of kaolin-water simulations for the 2.25 MHz low-frequency transducer on a 36 mm channel.
Figures 14A, 14B, 14C, 14D:
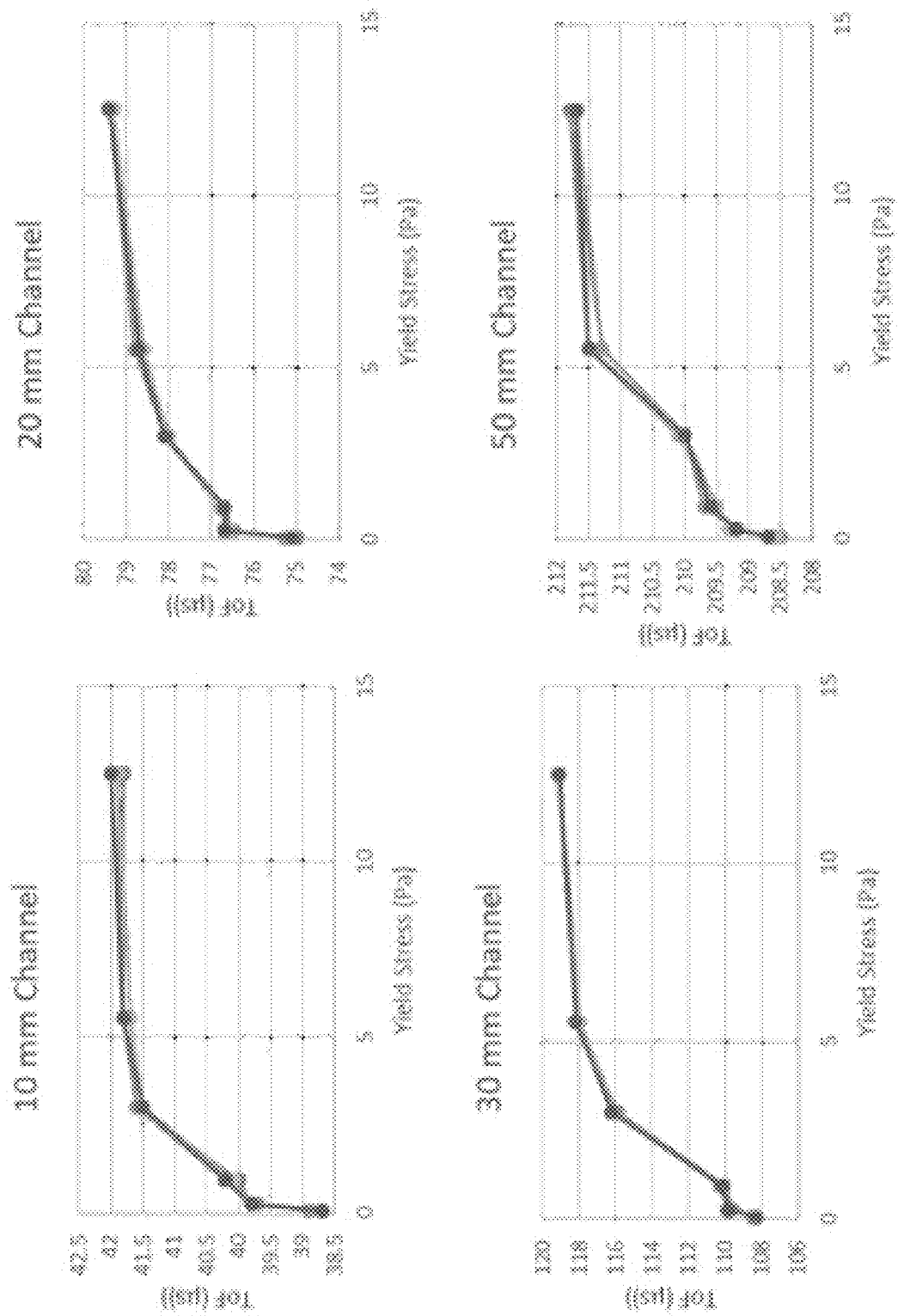
FIG. 14A (top left) shows a plot of time of flight (in μs) versus yield stress (in Pa) illustrating time of flight versus yield stress of kaolin-water simulations for the 2.25 MHz low-frequency transducer on a 10 mm channel.
FIG. 14B (top right) shows a plot of time of flight (in μs) versus yield stress (in Pa) illustrating time of flight versus yield stress of kaolin-water simulations for the 2.25 MHz low-frequency transducer on a 20 mm channel.
FIG. 14C (bottom left) shows a plot of time of flight (in μs) versus yield stress (in Pa) illustrating time of flight versus yield stress of kaolin-water simulations for the 2.25 MHz low-frequency transducer on a 30 mm channel.
FIG. 14D (bottom right) shows a plot of time of flight (in μs) versus yield stress (in Pa) illustrating time of flight versus yield stress of kaolin-water simulations for the 2.25 MHz low-frequency transducer on a 50 mm channel.

The results, shown in FIG. 7, indicate the values of yield stress versus solids concentration for the Swamee Aggarwal correlation shown in Table 1. The experiments focused on a range of yield stress from 6 Pa (34.47 wt %) to 30.11 Pa (41.28 wt %). From these results, the expected trend in growth for the yield stress as solids concentration is increased is present for the equation.

EXAMPLE 3

In the ultrasonic investigation, effort was focused on finding a relationship between the yield stress and speed of sound in the longitudinal wave mode. The premise of this method is the creation of a correlation between wave velocity and rheometer yield stress. Once a correlation is established that compares the wave velocity to the yield stress, the relationship can then be used to determine the yield stress of a sample by measuring the longitudinal wave velocity using a longitudinal wave transducer and analyzing the intersecting point that is interpolated from the correlation.

In order to find the longitudinal wave velocities, a Tektronix 4 Series Mixed Signal Oscilloscope MSO44 was utilized to obtain the echo generated by a 5 MHz longitudinal wave transducer. A plastic container with a span of 1.6 inches was used for the initial testing. The experimental setup is shown in FIGS. 9A-9C, 10A, and 10B.

Efforts were initially focused on slurries of kaolin in water and its effect on the speed of sound. First, the echo was captured for an empty container. By filling the container with water, a second echo appeared, which demonstrates that the wave traveled through the water and came back. Next, 5- and 10-percent kaolin were added to the water. For the 5-percent kaolin, the echo was shifted a little and the amplitude of the wave reduced significantly. For the 10-percent kaolin, the second echo disappeared, which means that the wave was not able to travel back to the sensor.

In order to be able to see the echo for higher percentages of kaolin, two new transducers were investigated. One of the new transducers had a lower excitation frequency (2.25 MHz) which improves the penetration of the wave inside the mixture. Another transducer, an immersion transducer, was also used to obtain improved accuracy for the mixture with higher percentages of kaolin. A set of containers with different widths were used for the testing in order to find the most efficient channel size for the experiment. The time of flight for each mixture in containers with different width were obtained. Results for plastic containers are shown in FIGS. 11A-11C, 12A-12D, 13A-13C, and 14A-14D. Results for metallic containers and pipes are shown in FIGS. 15A, 15B, 16, 17A, and 17B.

The changes of the yield stress with respect to mass percentage was also plotted to correlate the speed of sound with the yield stress and concentration (FIGS. 11A-11C, 12A-12D, 13A-13C, and 14A-14D). For the low frequency transducer, three different channel sizes were tested and repeated five times each to determine the optimal size for the channel (FIGS. 11A-11C, 13A-13C and 14A-14C). The echoes in the low-frequency transducer was detected for up to 40 wt % of the kaolin-water slurry using the 5-mm and 23-mm channel, and up to 37 wt % using the 36-mm channel. Also, the yield stress was measured for these channels in the range of 1 Pa to 25 Pa for the 5- and 23-mm channels. For the immersion transducer (FIGS. 12A-12D), four channels were tested and repeated in the same manner as the low-frequency transducer. For all channel widths, the echo was detected for up to 37 wt %, and detected from 1 Pa to 14 Pa of yield stress for all channel widths.

Figure 16A:
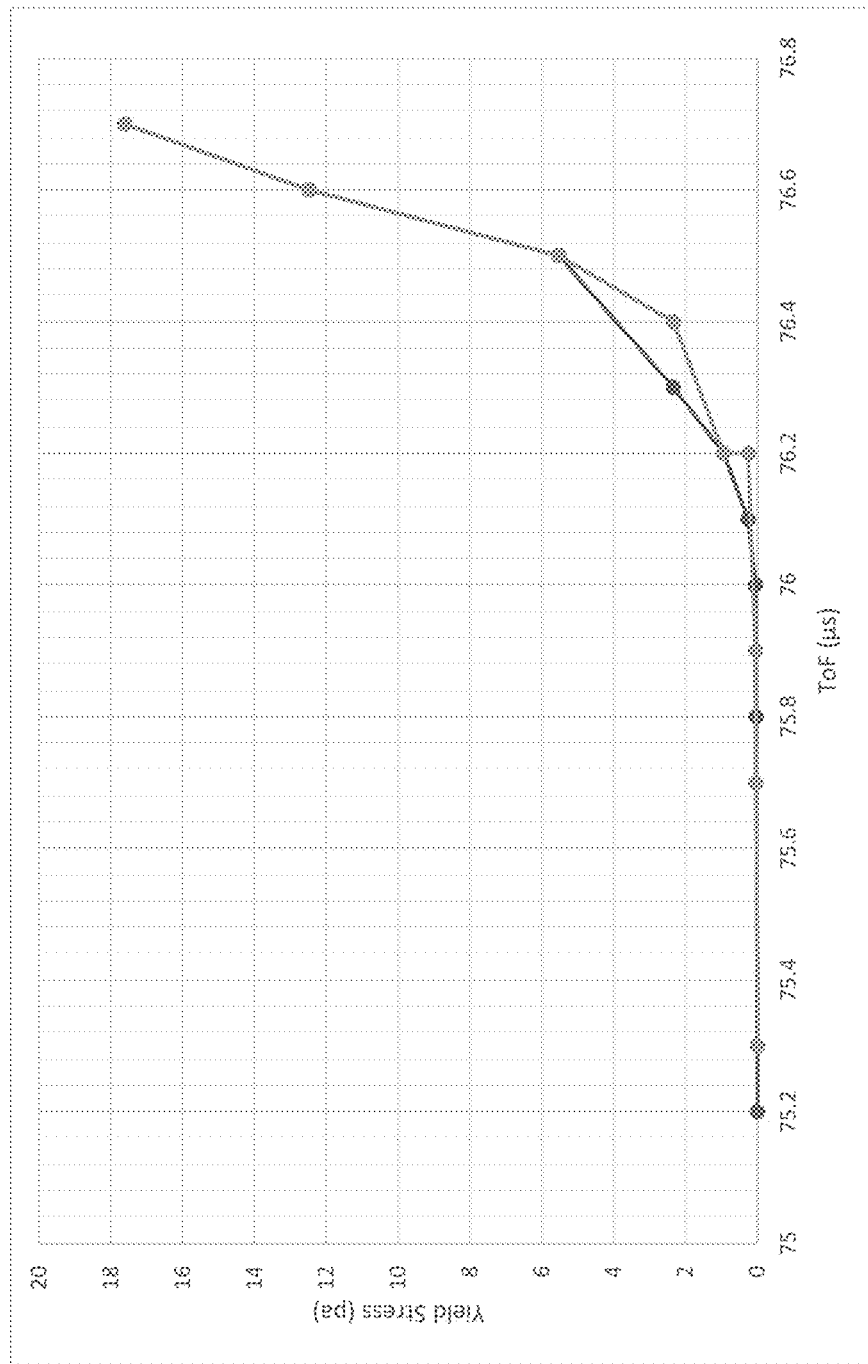
FIG. 16A shows a plot of yield stress (in Pa) versus time of flight (in μs) for an ultrasonic transducer and a metallic container.
Figure 16B:
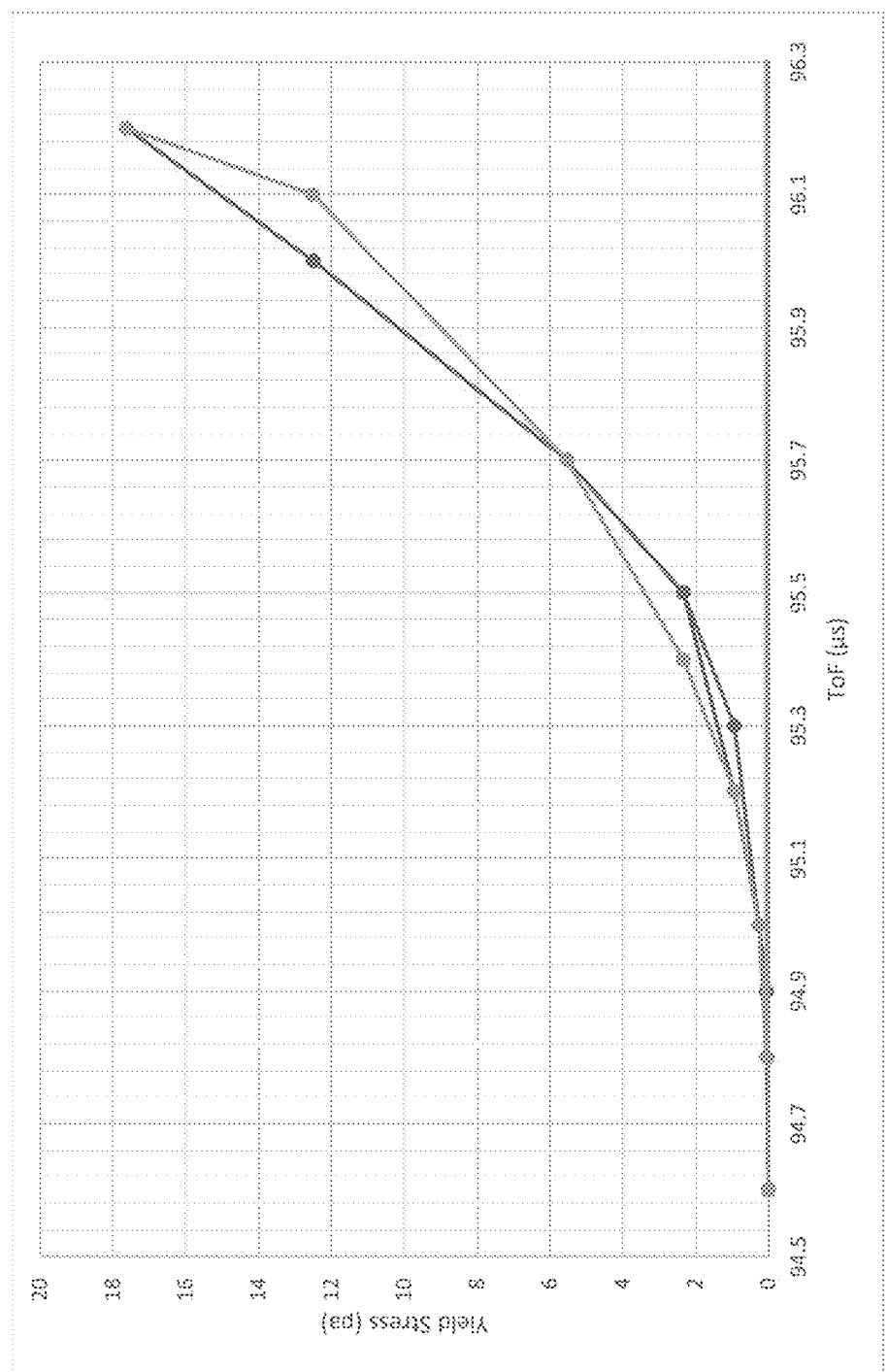
FIG. 16B shows a plot of yield stress (in Pa) versus time of flight (in μs) for an ultrasonic transducer and a metallic container of a different size than that used for FIG. 16A.
Figure 17:
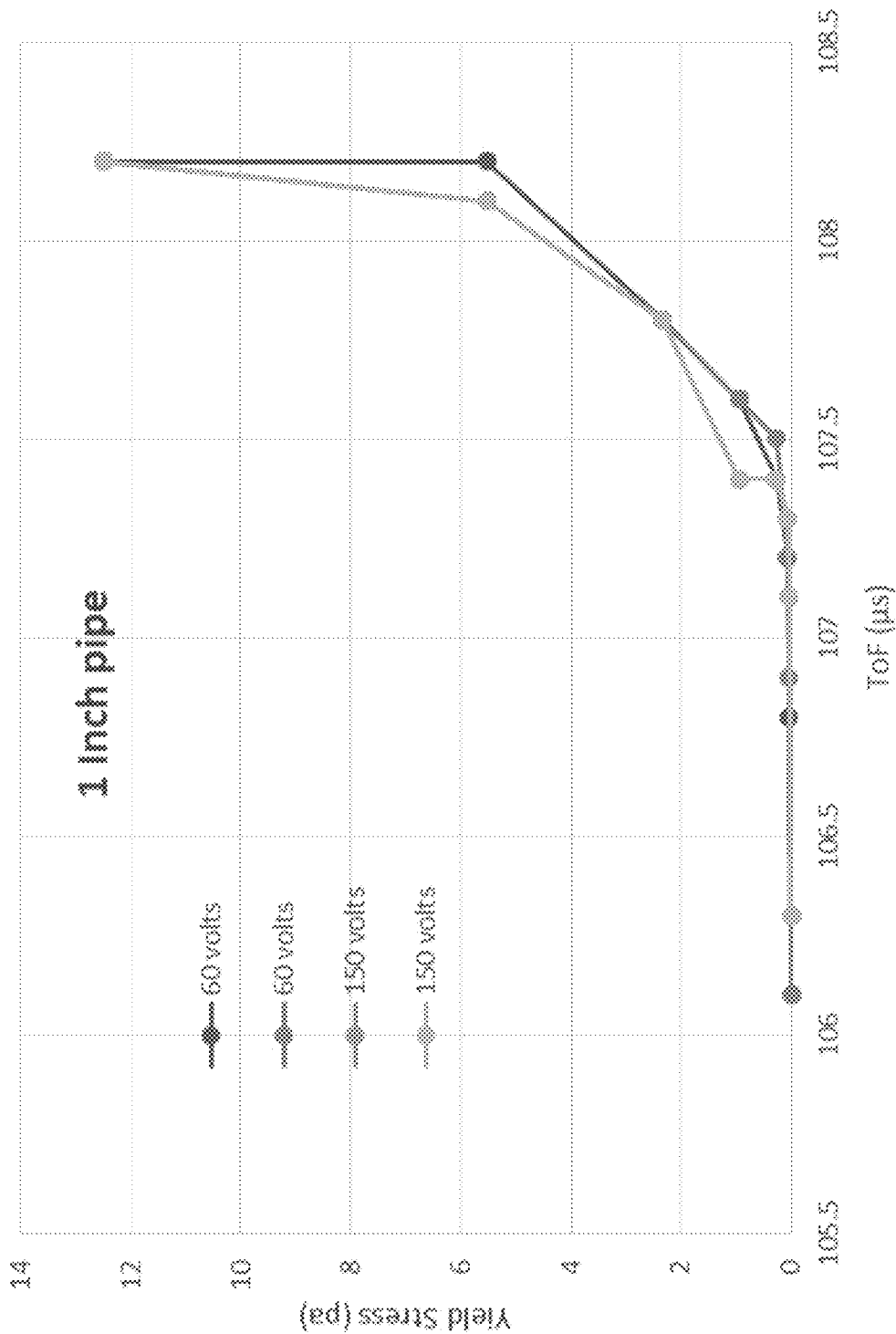
FIG. 17 shows a plot of yield stress (in Pa) versus time of flight (in μs) for an ultrasonic transducer and a metallic, one-inch diameter pipe.
Figure 18A:
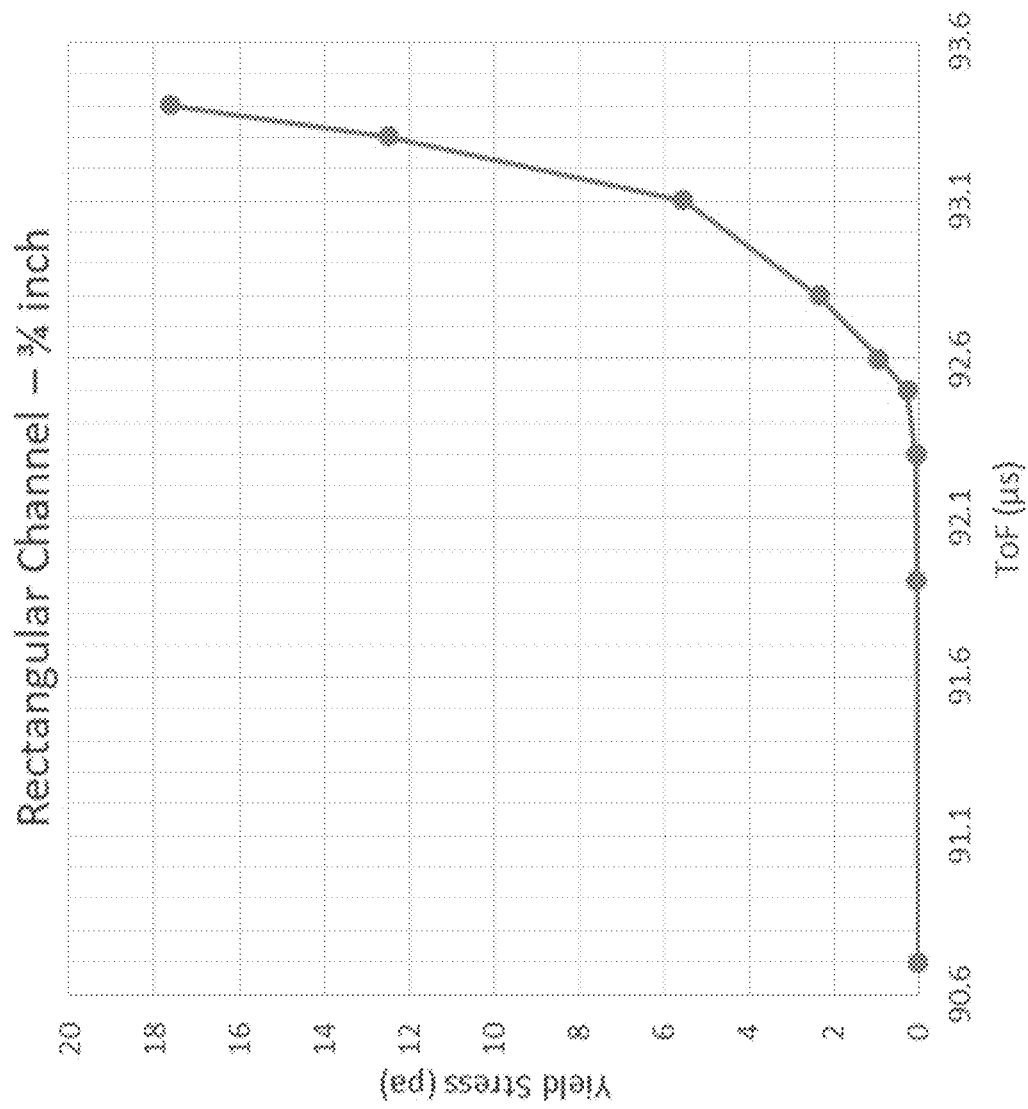
FIG. 18A shows a plot of yield stress (in Pa) versus time of flight (in μs) for an ultrasonic transducer and a metal, rectangular channel with a width of 0.75 inches.
Figure 18B:
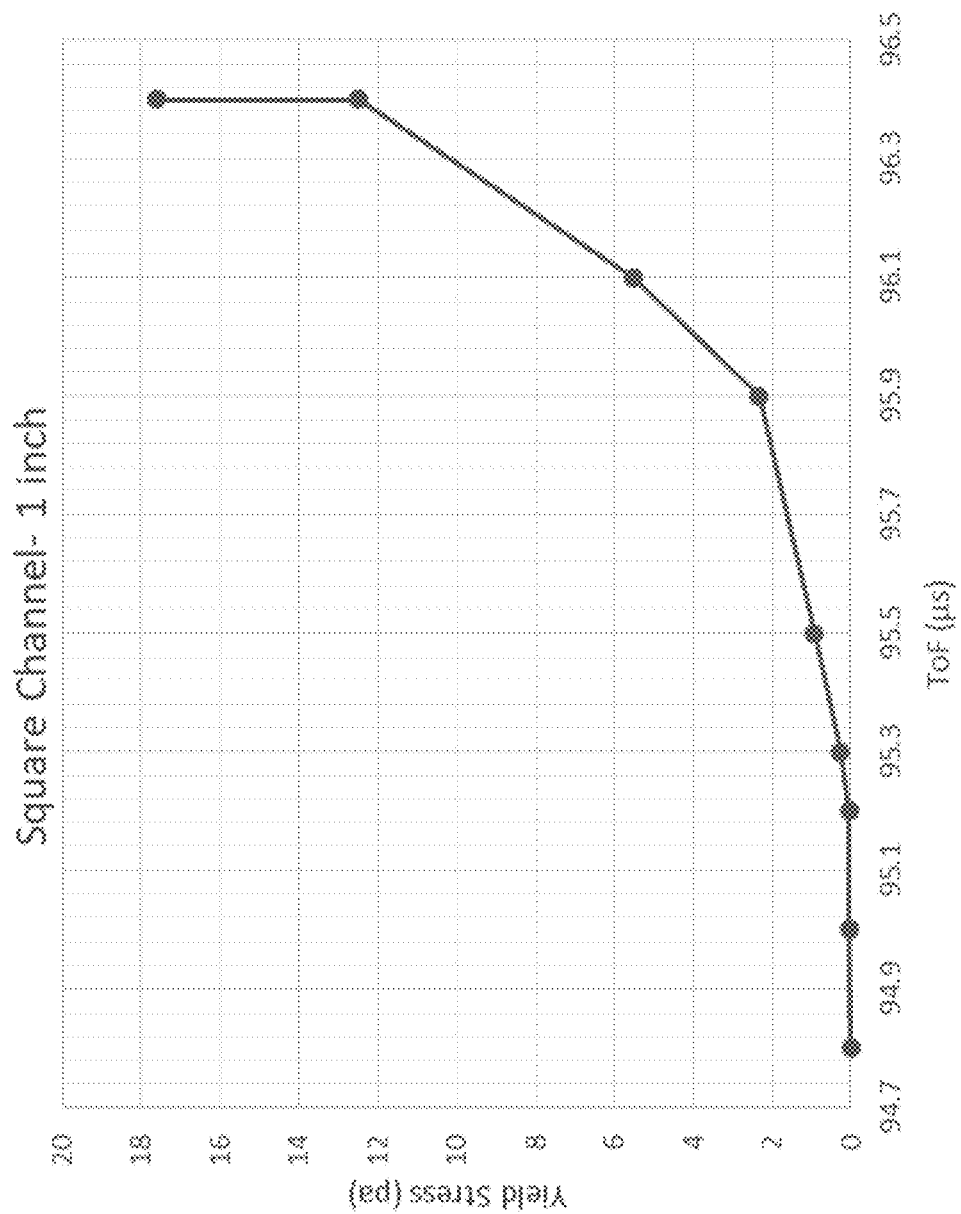
FIG. 18B shows a plot of yield stress (in Pa) versus time of flight (in μs) for an ultrasonic transducer and a metal, square channel with a width of 1 inch.

FIGS. 16A, 16B, 17, 18A, and 18B show results of ultrasonic transducers in metallic containers and pipes. FIGS. 16A and 16B show the variation of yield stress versus ToF for two different size containers. FIG. 17 shows the variation of yield stress versus ToF for a metallic one inch diameter pipe. FIGS. 18A and 18B show the variation of yield stress versus ToF for two metal rectangular channels with different widths.

Several methods for real-time inline monitoring of yield stress were successfully evaluated. These methods investigated pressure loss in laminar flow and liquid rise in a vertical riser in a 20-foot, one-inch diameter steel loop and referenced against baseline measurements using a HAAKE ViscoTester iQ air rheometer to determine the performance of the method across a range of yield stresses for slurries at varying solid concentrations. For the liquid rise method, an agreement with rheology data from 2 Pa of yield stress at 1.22 SG (28.5 wt %) to 21.7 Pa of yield stress at 1.30 SG (37.0 wt %) was demonstrated. For the pressure loss method, it was demonstrated that the Swamee-Aggarwal correlation, derived from the Darcy-Weisbach equation, showed strong agreement with the rheometer measured yield stress for a range of yield stress from 6 Pa (34.47 wt. %) to 30.11 Pa (41.28 wt %). Longitudinal wave investigations were done using a 2.25-MHz low frequency transducer and 2.25-MHz immersion transducer on various channel sizes (5 mm, 23 mm, and 36 mm for low frequency transducer, and 10 mm, 20 mm, 30 mm, 50 mm channels for immersion transducer) to determine the optimal channel sizes. For the low-frequency transducer, the echoes were detected for up to 40 wt % of a kaolin-water slurry using the 5-mm and 23-mm channel, and up to 37 wt % using the 36-mm channel. For the immersion transducer, four channels were tested and repeated in the same manner as the low-frequency transducer. For all channel widths, the echo was detected for up to 37 wt %. Yield stress was also determined for a range of time of flight from 1 Pa to 25 Pa in the 5- and 23-mm channels, and up to 12 Pa for the 36-mm channel on the low-frequency transducer; for the immersion transducer, up to 12 Pa of yield stress was detected for all channel widths.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for determining yield stress of a non-Newtonian fluid, the system comprising:

a pipe containing the non-Newtonian fluid;

a differential type pressure transmitter connected to a first point of the pipe and a second point of the pipe, the pipe containing therein a fully-developed laminar flow of the non-Newtonian fluid between the first point and the second point;

a processor;

a machine-readable medium in operable communication with the processor and having instructions stored thereon that, when executed by the processor, solve equations (1), (2), and (3) in order to determine the yield stress of the non-Newtonian fluid; and a flow meter connected to the pipe and configured to measure a velocity of the non-Newtonian fluid, the differential type pressure transmitter being configured to measure a first pressure of the pipe at the first point and a second pressure of the pipe at the second point, the yield stress of the non-Newtonian fluid being determined in real time by the processor using the difference between the first pressure and the second pressure as an input to equation (1), and equations (1), (2), and (3) being as follows $$\frac{\Delta P}{L} = \frac{f \rho V^2}{2D} \quad (1)$$

$$f = \frac{64}{Re} + \frac{64}{Re}\left(\frac{He}{6.2218\,Re}\right)^{0.958} \quad (2)$$

$$H = \frac{D^2 \rho \tau_y}{\mu^2} \quad (3)$$

where $\Delta P$ is the difference between the first pressure and the second pressure, L is a predetermined length of the pipe between the first point and the second point, D is a predetermined diameter of the pipe between the first point and the second point, o is a predetermined density of the non-Newtonian fluid, f is a frictional coefficient of the non-Newtonian fluid, V is the velocity of the non-Newtonian fluid in the pipe between the first point and the second point measured by the flow meter, $\mu$ is a viscosity of the non-Newtonian fluid, Re is a Reynolds number of the non-Newtonian fluid in the pipe between the first point and the second point, He is a Hedstrom number of the non-Newtonian fluid in the pipe between the first point and the second point, and ty is the yield stress of the non-Newtonian fluid.

2. The system according to claim 1, the flow meter being further configured to adjust a flow of the non-Newtonian fluid in the pipe to ensure that it is fully-developed laminar flow between the first point and the second point.

3. A method for determining yield stress of a non-Newtonian fluid, the method comprising:

providing the system according to claim 1;

measuring the difference between the first pressure and the second pressure using the differential type pressure transmitter; and determining the yield stress of the non-Newtonian fluid using the processor and the machine-readable to solve equations (1), (2), and (3) with the difference between the first pressure and the second pressure being an input to equation (1).

4. The method according to claim 3, the yield stress being determined in real time without any sample of the non-Newtonian fluid being removed from the pipe.

* * * * *